United States Patent
Saka et al.

(10) Patent No.: US 6,570,103 B1
(45) Date of Patent: May 27, 2003

(54) METHOD AND APPARATUS FOR COORDINATE INPUTTING CAPABLE OF EFFECTIVELY USING A LASER RAY

(75) Inventors: Yasuhiko Saka, Tokyo (JP); Kenichi Takekawa, Aichi-ken (JP)

(73) Assignee: Ricoh Company, Ltd., Tokyo (JP)

( * ) Notice: Subject to any disclaimer, the term of this patent is extended or adjusted under 35 U.S.C. 154(b) by 253 days.

(21) Appl. No.: 09/655,776

(22) Filed: Sep. 5, 2000

(30) Foreign Application Priority Data

Sep. 3, 1999 (JP) .......................................... 11-249866
Nov. 12, 1999 (JP) .......................................... 11-322473

(51) Int. Cl.[7] ............................................ G08C 21/00
(52) U.S. Cl. ................................ 178/18.01; 178/18.03; 178/18.04; 178/18.05; 178/18.06; 178/18.07; 178/19.01; 178/19.02; 178/19.03; 345/156; 345/158; 345/162; 345/166; 345/173; 345/207; 250/227.11; 250/227.14; 340/555; 340/556; 341/5
(58) Field of Search ................................. 345/156, 158, 345/162, 166, 173, 178, 204, 207; 178/180.01, 18.03, 18.04–18.07, 19.01, 19.02, 19.03; 250/216, 222.1, 227.11, 227.16; 340/555, 556, 557; 341/5

(56) References Cited

U.S. PATENT DOCUMENTS

| | | | | |
|---|---|---|---|---|
| 4,725,726 A | * | 2/1988 | Hasegawa et al. | 250/221 |
| 4,751,379 A | * | 6/1988 | Sasaki et al. | 250/221 |
| 5,148,016 A | * | 9/1992 | Murakami et al. | 250/221 |
| 5,283,428 A | * | 2/1994 | Morishita et al. | 250/214.1 |
| 5,577,733 A | * | 11/1996 | Downing | 250/222.2 |
| 5,988,645 A | * | 11/1999 | Downing | 250/222.2 |
| 6,118,143 A | * | 5/2000 | Kim | 257/249 |
| 6,229,601 B1 | * | 5/2001 | Hasegawa | 341/5 |
| 6,362,468 B1 | * | 3/2002 | Murakami et al. | 250/221 |

FOREIGN PATENT DOCUMENTS

| | | |
|---|---|---|
| JP | 58084374 | 5/1983 |
| JP | 58127279 | 7/1983 |
| JP | 59168583 | 9/1984 |
| JP | 08221201 | 8/1996 |

* cited by examiner

*Primary Examiner*—Bipin Shalwala
*Assistant Examiner*—Vincent E. Kovalick
(74) *Attorney, Agent, or Firm*—Oblon, Spivak, McClelland, Maier & Neustadt, P.C.

(57) ABSTRACT

A coordinate input apparatus includes light sources, a reflecting member, light receiving members, a signal analyzing mechanism, and a coordinate determining mechanism. Each light source is fixed around a perimeter of a predefined input region at a fixing position different from others and is configured to emit light extending in a deltaic form centered at the fixing position and approximately in parallel to the input region. The reflecting member is fixed around the perimeter of the input region and is configured to recursively reflect the light so that the light returns towards the light sources. The light receiving members are fixed around the perimeter of the input region and are configured to receive the light recursively reflected from the reflecting member and to convert the light into an electric signal. The signal analyzing mechanism analyzes the electric signal to detect a position of an obstacle when the obstacle is placed in the input region and blocks the light. The coordinate determining mechanism calculates a center between coordinates of one and the other edges of the obstacle and determines the center as a coordinate of the position of the obstacle in the input region.

34 Claims, 22 Drawing Sheets

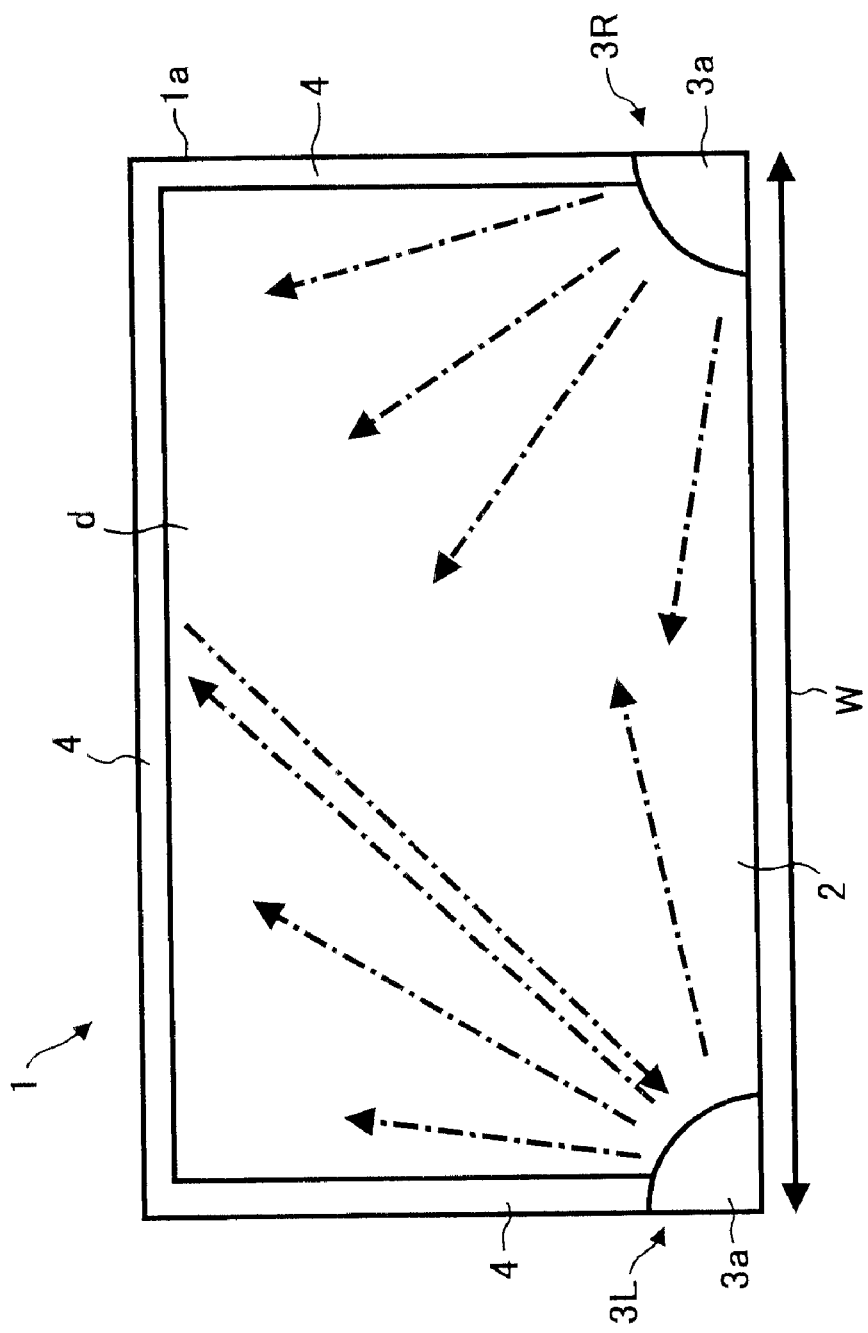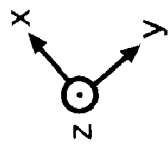

A: REFERENCE VALUE
$A_1$: ACTUAL VALUE

D2
D4

D1
D3

T: REFERENCE VALUE
$T_1$: ACTUAL VALUE

A: REFERENCE VALUE
A₁: ACTUAL VALUE
0TH PIXEL

De

EDGE COORDINATE : X

| X | Y | XY | X² |
|---|---|---|---|
| -K | Yn-1 | -KYn-1 | K² |
| 0 | Yn | 0 | 0 |
| K | Yn+1 | KYn+1 | K² |
| Σ  0 | Yn-1+Yn+Yn+1 | K(Yn+1-Yn-1) | 2K² |

METHOD AND APPARATUS FOR COORDINATE INPUTTING CAPABLE OF EFFECTIVELY USING A LASER RAY

CROSS-REFERENCE TO RELATED APPLICATIONS

This application claims priority to Japanese patent application Nos. JPAP11-249866 filed on Sep. 3, 1999 and JPAP11-322473 filed on Nov. 12, 1999 in the Japanese Patent Office, the entire contents of which are hereby incorporated by reference.

BACKGROUND

1. Field

The present invention relates to a method and apparatus for coordinate inputting, and more particularly to a method and apparatus for coordinate inputting that is capable of effectively using a laser ray.

2. Description of the Related Arts

A coordinate input apparatus capable of optic ally detecting an obstacle such as a finger or a pen has been widely used in an electronic copyboard, a video conference system, and so forth. One example of the coordinate input apparatus is described in U.S. Pat. No. 5,241,139 issued on Aug. 31, 1993 to Gungl et al.

In general, the coordinate input apparatus is configured to detect a coordinate of a position of an obstacle such as a finger or a pen (i.e., a stylus) when the obstacle is placed in an input region and blocks light running in the input region. Therefore, resolution of the coordinate needs to be finer by several orders of magnitude to compare with the size of the obstacle. This becomes more pronounced, particularly in a case where the coordinate input apparatus is installed on a display face of a display unit and a track of the obstacle moving in the input region is displayed on the display face. That is, the resolution of the coordinate is required to be comparable to that of the display unit. But, if such a high resolution is applied to the coordinate, even an edge of an obstacle may be detected as a position of the obstacle. As a result, the position of the obstacle may be displayed with a displacement on the display unit. Also, if such a high resolution is applied to the coordinate, the coordinate input apparatus needs to increase a number of detecting devices in response to an increase of the resolution. In this case, the manufacturing cost of the coordinate input apparatus will be increased.

SUMMARY

The present invention provides a novel coordinate input apparatus. In one example, a novel coordinate input apparatus includes a plurality of light sources, a reflecting member, a plurality of light receiving members, a signal analyzing mechanism, and a coordinate determining mechanism. Each of the plurality of light sources is fixed around a perimeter of a predefined input region at a fixing position different from others and is configured to emit light extending in a deltaic form centered at the fixing position and approximately in parallel to the predefined input region. The reflecting member is fixed around the perimeter of the predefined input region and is configured to recursively reflect the light so that the light returns towards the plurality of light sources. The plurality of light receiving members are fixed around the perimeter of the predefined input region and are configured to receive the light recursively reflected from the reflecting member and to convert the light into an electric signal. The signal analyzing mechanism analyzes the electric signal to detect a position of an obstacle when the obstacle is placed in the input region and blocks the light. The coordinate determining mechanism calculates a center between coordinates of one and the other edges of the obstacle and determines the center as a coordinate of the position of the obstacle in the input region.

The present invention further provides a novel coordinate input apparatus. In one example, a novel coordinate input apparatus includes a plurality of light sources, a reflecting member, a plurality of light receiving members, a signal analyzing mechanism, a memory, and a coordinate determining mechanism. Each of the plurality of is fixed around a perimeter of a predefined input region at a fixing position different from others and is configured to emit light extending in a deltaic form centered at the fixing position and approximately in parallel to the predefined input region. The reflecting member is fixed around the perimeter of the predefined input region and is configured to recursively reflect the light so that the light returns towards the plurality of light sources. The plurality of light receiving members are fixed around the perimeter of the predefined input region and are configured to receive the light recursively reflected from the reflecting member and to convert the light into an electric signal. The signal analyzing mechanism analyzes the electric signal to detect a position of an obstacle when the obstacle is placed in the input region and blocks the light. The memory prestores a first light amount reference and a second light amount reference having a value greater than that of the first light amount reference. The coordinate determining mechanism determines a coordinate of the position of the obstacle placed in the input region based on a plurality of successively-aligned pixels in the electric signal, including at least a focus pixel and pixels immediately previous to and immediately subsequent to the focus pixel, and the first and second light amount references. This determination is performed in the following manners. When each of the immediately previous, focus and immediately subsequent pixels has a brighter value than that of the second light amount reference, a coordinate of the focus pixel is not a coordinate of an edge of the obstacle. When each of the immediately previous and focus pixels has a brighter value than that of the second light amount reference and the immediately subsequent pixel has a darker value that those of the first and second light amount references, the coordinate of the focus pixel is not a coordinate of an edge of the obstacle. When the immediately previous pixel has a brighter value than that of the second light amount reference, when the focus pixel has a darker value that that of the second light amount reference, and when the immediately subsequent pixel has a darker value that those of the first and second light amount references, the coordinate of the focus pixel is a coordinate between a center and a right edge of the obstacle. When the immediately previous pixel has a brighter value than that of the second light amount reference, when the focus pixel has a darker value that that of the first light amount reference, and when the immediately subsequent pixel has a darker value that those of the first and second light amount references, the coordinate of the focus pixel is a coordinate of the center of the obstacle. When the immediately previous pixel has a darker value than those of the first and second light amount references and when each of the focus and immediately subsequent pixels has a brighter value that that of the second light amount reference, the coordinate of the focus pixel is not the coordinate of the center of the obstacle. When the immediately previous pixel has a darker value than those of the first and second light amount references, when the focus pixel has a darker value than that of the second light amount reference, and when the immediately subsequent pixel has a brighter value that that of the second light amount reference, the coordinate of the focus pixel is a coordinate between a left edge and the center of the obstacle. When the immediately previous pixel has a darker value than those of the first and second light amount references, when the focus pixel has a darker value than that of the first light amount reference, and when the immediately subsequent pixel has a brighter value that that of the second light amount reference, the coordinate of the focus pixel is the coordinate of the center of the obstacle. When each of the immediately previous, focus, and immediately subsequent pixels has a darker value than those of the first and second light amount references, the coordinate of the focus pixel is not a coordinate of an edge of the obstacle.

Further, the present invention provides a novel coordinate input apparatus. In one example, a novel coordinate input apparatus includes a plurality of light sources, a reflecting member, a plurality of light receiving members, a signal analyzing mechanism, and a coordinate determining mechanism. Each of the plurality of light sources is fixed around a perimeter of a predefined input region at a fixing position different from others and is configured to emit light extending in a deltaic form centered at the fixing position and approximately in parallel to the predefined input region. The reflecting member is fixed around the perimeter of the predefined input region and is configured to recursively reflect the light so that the light returns towards the plurality of light sources. The plurality of light receiving members are fixed around the perimeter of the predefined input region and configured to receive the light recursively reflected from the reflecting member and to convert the light into an electric signal. Each of the plurality of light receiving members includes a photoelectric conversion cell array having a plurality of photoelectric conversion cells placed in a line for receiving the light reflected from the reflecting member. In this case, an order of the plurality of the photoelectric conversion cells placed in a line corresponds to coordinates of the input region. The signal analyzing mechanism analyzes the electric signal to detect a position of an obstacle when the obstacle is placed in the input region and blocks the light. The coordinate determining mechanism determines a coordinate of the position of the obstacle placed in the input region based on a result of an analysis made by the signal analyzing mechanism.

The above-mentioned photoelectric conversion cell array may be a charge-coupled device, a phototransistor array, or a photodiode array.

The above-mentioned coordinate input apparatus may further include a correcting mechanism for correcting the electric signal output from each of the light receiving members for an angle displacement of the each of the light receiving members.

The above-mentioned coordinate input apparatus may further include a correcting mechanism for correcting the electric signal output from each of the light receiving members for a position displacement of the each of the light receiving members.

Further, the present invention provides a novel method for coordinate input. In one example, a novel method for coordinate input includes the steps of providing, causing, reflecting, receiving, converting, analyzing, calculating, and determining. The providing step provides a plurality of light sources, each of which is fixed around a perimeter of a predefined input region at a fixing position different from others. The causing step causes the plurality of light sources to emit light extending in a deltaic form centered at the fixing position and approximately in parallel to the predefined input region. The reflecting step reflects the light recursively around the perimeter of the predefined input region. The receiving step receives the light reflected by the reflecting step by a plurality of light receiving members fixed around the perimeter of the predefined input region. The converting step converts the light received by the reflecting step into an electric signal. The analyzing step analyzes the electric signal to detect a position of an obstacle when the obstacle is placed in the input region and blocks the light. The calculating step calculates a center between coordinates of one and the other edges of the obstacle. The determining step determines the center as a coordinate of the position of the obstacle in the input region.

Further, the present invention provides a novel method for coordinate input. In one example, a novel method for coordinate input includes the steps of prestoring, providing, causing, reflecting, receiving, converting, analyzing, calculating, and determining. The prestoring step prestores into a memory a first light amount reference and a second light amount reference having a value greater than that of the first light amount reference. The providing step provides a plurality of light sources, each of which is fixed around a perimeter of a predefined input region at a fixing position different from others. The causing step causes the plurality of light sources to emit light extending in a deltaic form centered at the fixing position and approximately in parallel to the predefined input region. The reflecting step reflects the light recursively around the perimeter of the predefined input region. The receiving step receives the light reflected by the reflecting step by a plurality of light receiving members fixed around the perimeter of the predefined input region. The converting step converts the light received by the reflecting step into an electric signal. The analyzing step analyzes the electric signal to detect a position of an obstacle when the obstacle is placed in the input region and blocks the light. The determining step determines a coordinate of the position of the obstacle placed in the input region based on a plurality of successively-aligned pixels in the electric signal, including at least a focus pixel and pixels immediately previous to and immediately subsequent to the focus pixel, and the first and second light amount references. The determination is performed in the following manners. When each of the immediately previous, focus and immediately subsequent pixels has a brighter value than that of the second light amount reference, a coordinate of the focus pixel is not a coordinate of an edge of the obstacle. When each of the immediately previous and focus pixels has a brighter value than that of the second light amount reference and the immediately subsequent pixel has a darker value that those of the first and second light amount references, the coordinate of the focus pixel is not a coordinate of an edge of the obstacle. When the immediately previous pixel has a brighter value than that of the second light amount reference, when the focus pixel has a darker value that that of the second light amount reference, and when the immediately subsequent pixel has a darker value that those of the first and second light amount references, the coordinate of the focus pixel is a coordinate between a center and a right edge of the obstacle. When the immediately previous pixel has a brighter value than that of the second light amount reference, when the focus pixel has a darker value that that of the first light amount reference, and when the immediately subsequent pixel has a darker value that those of the first and second light amount references, the coordinate of the focus pixel is a coordinate of the center of the obstacle. When the immediately previous pixel has a darker value than those of the first and second light amount references and when each of the focus and immediately subsequent pixels has a brighter value that that of the second light amount reference, the coordinate of the focus pixel is not the coordinate of the center of the obstacle. When the immediately previous pixel has a darker value than those of the first and second light amount references, when the focus pixel has a darker value than that of the second light amount reference, and when the immediately subsequent pixel has a brighter value that that of the second light amount reference, the coordinate of the focus pixel is a coordinate between a left edge and the center of the obstacle. When the immediately previous pixel has a darker value than those of the first and second light amount references, when the focus pixel has a darker value than that of the first light amount reference, and when the immediately subsequent pixel has a brighter value that that of the second light amount reference, the coordinate of the focus pixel is the coordinate of the center of the obstacle. When each of the immediately previous, focus, and immediately subsequent pixels has a darker value than those of the first and second light amount references, the coordinate of the focus pixel is not a coordinate of an edge of the obstacle.

Further, the present invention provides a novel coordinate input apparatus. In one example, a novel coordinate input apparatus includes a touch-panel, a plurality of light sources, a reflecting member, a plurality of light receiving members, a signal analyzing mechanism, a coordinate calculating mechanism, and a coordinate determining mechanism. Each of the plurality of light sources is fixed around a perimeter of the touch-panel at a fixing position different from others and is configured to emit light extending in a deltaic form centered at the fixing position and approximately in parallel to the touch-panel. The reflecting member is fixed around the perimeter of the touch-panel and is configured to recursively reflect the light so that the light returns towards the plurality of light sources. The plurality of light receiving members are fixed around the perimeter of the touch-panel and are configured to receive the light recursively reflected from the reflecting member and to convert the light into an electric signal. In this case, the plurality of light receiving members are integral with the plurality of light sources. The signal analyzing mechanism analyzes the electric signal to detect a position of an obstacle when the obstacle is placed on the touch-panel and blocks the light. The coordinate calculating mechanism executes an approximate equation which subtracts variations of the light amount from coordinates respectively close to coordinates of one and the other edges of the obstacle in order to obtain coordinates in accordance with a light amount reference. Further, the coordinate calculating mechanism outputs the coordinates obtained through the approximate equation as true coordinates of one and the other edges of the obstacle. The coordinate determining mechanism calculates a center between the true coordinates of one and the other edges of the obstacle and determines the center calculated as a coordinate of the position of the obstacle placed the touch-panel.

The coordinate calculating mechanism may execute the approximate equation using light amount of a pixel of which value first exceeds that of the light amount reference and light amounts of pixels immediately previous to and immediately subsequent to the first exceeding pixel.

Further, the present invention provides a novel coordinate input apparatus. In one example, a novel coordinate input apparatus includes a touch-panel, a plurality of light sources, a reflecting member, a plurality of light receiving members, a signal analyzing mechanism, a coordinate calculating mechanism, and a coordinate determining mechanism. Each of the plurality of light sources is fixed around a perimeter of the touch-panel at a fixing position different from others and is configured to emit light extending in a deltaic form centered at the fixing position and approximately in parallel to the touch-panel. The reflecting member is fixed around the perimeter of the touch-panel and is configured to recursively reflect the light so that the light returns towards the plurality of light sources. The plurality of light receiving members are fixed around the perimeter of the touch-panel and are configured to receive the light recursively reflected from the reflecting member and to convert the light into an electric signal. In this case, the plurality of light receiving members are integral with the plurality of light sources. The signal analyzing mechanism analyzes the electric signal to detect a position of an obstacle when the obstacle is placed on the touch-panel and blocks the light. The coordinate calculating mechanism calculates a center between coordinates of one and the other edges of the obstacle. The coordinate determining mechanism determines a coordinate X of the position of the obstacle by executing an equation;

$$X = X_n + 2K[Y_s - \{Y_{(n+1)} + Y_n + Y_{(n-1)}\}/3]/\{Y_{(n+1)} - Y_{(n-1)}\},$$

wherein $Y_s$ represents a value of the light amount reference, $Y_n$ represents a light amount value of an nth pixel to be a focus pixel, $Y_{(n-1)}$ represents a light amount value of a (n−1)th pixel, $Y_{(n+1)}$ represents a light amount value of a (n+1)th pixel, $X_n$ represents a coordinate of the nth pixel as the focus pixel, $X_{(n-1)}$ represents a coordinate of a (n−1)th pixel, $X_{(n+1)}$ represents a coordinate of a (n+1)th pixel, and K represents a coordinate difference between two adjacent pixels.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein:

FIG. 1 is an illustration for explaining a coordinate input apparatus according to a embodiment of the present invention;

DETAILED DESCRIPTION

Figure 2:
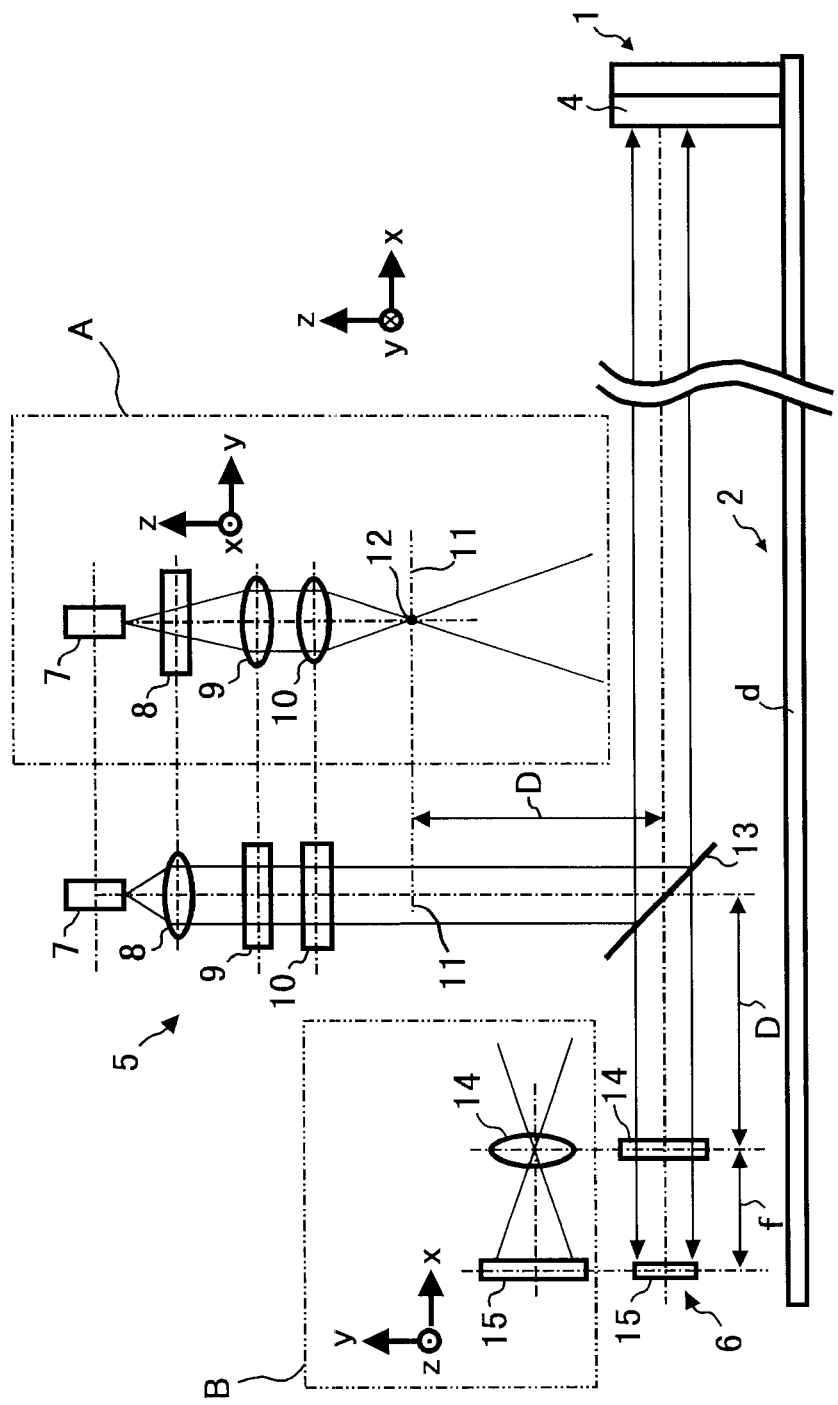
FIG. 2 is a schematic diagram for showing an optical unit of the coordinate input apparatus of FIG. 1.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numerals designate identical or corresponding parts throughout the several views, particularly to FIG. 1, there is illustrated a coordinate input apparatus 1, using an optically-input method, according to an embodiment of the present invention. The coordinate input apparatus 1 of FIG. 1 is generally connected to an external system such as a personal computer, which is occasionally referred to as a driver hereinafter, and is provided on a front surface of a display unit d. The display unit d is controlled by the personal computer and displays characters, figures, and so forth sent from the computer.

As shown in FIG. 1, the coordinate input apparatus 1 includes a frame 1a, an input region 2, optical units 3L and 3R, optical-unit casings 3a, and recursive reflecting members 4. The frame 1a is configured to determine a position of the input region 2 based on the size of the display unit d. The input region 2 is a region in which a user is allowed to draw characters, figures, and so forth so as to input coordinates of these handwritten inputs. The optical units 3L and 3R are respectively mounted inside the optical-unit casings 3a, apart from each other at positions around the perimeter of the frame 1a, for example, left-bottom and right-bottom, respectively, of the frame 1a. Each of the optical units 3L and 3R includes a light source 5 (FIG. 2) and a light receiving unit 6 (FIG. 2). Each of the light sources 5 generates light in parallel to the surface of the input region 2 and extending to cover the entire portion of the input region 2 in a deltaic form centered at the position where the light source 5 locates. The recursive reflecting members 4 are mounted on the perimeter of the input region 2 and reflects the light from the light sources 5 of the optical units 3L and 3R recursively back to the optical units 3L and 3R so that the reflected light are input to the respective light receiving units 6 of the optical units 3L and 3R. In the coordinate input apparatus 1 configured in the above-mentioned way, when a drawing tool such as a pen, a finger, or the like is placed within the input region 2 on the display unit d, the drawing tool blocks the light from the optical units 3L and 3R and the position of the drawing tool at that moment is detected. The recursive reflecting members 4 are particularly provided on the left, right, and top sides of the perimeter of the input region 2, to which the light from the optical units 3L and 3R extends, but not on the bottom side thereof to which the light from the optical units 3L and 3R does not extend.

The optical units 3L and 3R, mounted inside the optical-unit casings 3a and on the frame 1a, are apart from each other with a distance W. The recursive reflecting members 4, mounted inside the frame 1a and on the top, left, and right sides of the perimeter thereof, are made of a plurality of corner cubes in a conical shape, for example. The recursive reflecting members 4 reflects the light from the optical units 3L and 3R recursively back to the respective optical units 3L and 3R. For example, by the recursive reflecting members 4, the light from the optical unit 3L is reflected back to the optical unit 3L through the same light path.

FIG. 2 illustrates a configuration of the optical units 3L and. 3R shown in a direction of the y-axis. In FIG. 2, an illustration framed with a phantom line and labeled with a letter A shows the light source 5 of the optical units 3L and 3R shown in a direction of the x-axis. In addition, an illustration framed with another phantom line and labeled with a letter B shows the light receiving unit 6 of the optical units 3L and 3R shown in a direction of the z-axis. In this case, the x-axis, y-axis, and z-axis are perpendicular to one to the other.

The light source 5 includes a laser ray source 7 capable of focusing the pencil of the laser ray. The laser ray source 7 emits a laser ray in a direction perpendicular to the surface of the display unit d. The laser ray is collimated in the x-axis direction by a cylindrical lens 8 capable of varying a magnification in one direction and is converged relative to the y-axis direction by two cylindrical lenses 9 and 10 each having a curvature distribution rectangular to that of the cylindrical lens 8. After that, the laser lay enters a slit formed on a slit plate 11. The slit is long and narrow in the x-axis and y-axis directions, respectively, and forms a secondary light source 12.

The laser ray emitted from the secondary light source 12 is reflected by a half mirror 13 so as to be made approximately in parallel to the surface (a display surface) of the display unit d, extending through the input region 2 in a deltaic form centered at the position where the secondary light source 12 locates. The cylindrical lenses 8–10 and the slit plate 11 form a light-convergence optical system for converging the laser ray emitted from the laser ray source 7 into a ray extending in a deltaic space of the input region 2.

The delta ray in the input region 2 is recursively reflected by the recursive reflector 4 back to the half mirror 13 through the same light path. The reflected ray proceeds straight, passing through the half mirror 13, and is separated from the laser ray running from the light source to the input region 2. After that, the ray enters the light receiving unit 6. In this case, the half mirror 13 forms a ray separator for separating the ray returning from the input region 2 from the ray proceeding to the input region 2.

In the light receiving unit 6, the laser ray passes through a cylindrical lens 14 that functions as a convergent lens and is formed in a linear shape. After that, the laser ray enters a light receiving device 15 mounted on a position having a distance f from the cylindrical lens 14, wherein the distance f represents a focal length of the cylindrical lens 14. The light receiving device 15 includes a photoelectric conversion array (not shown) in which a plurality of photoelectric conversion cells (not shown) are arranged in a line. The photoelectric conversion array converts the laser ray coming through the cylindrical lens 14 into an electric signal in accordance with a strength of the light. The photoelectric conversion array uses a CCD (charge-coupled device), a photo-transistor array, or a photo-diode array so that each photoelectric conversion cell receives and photoelectric-converts one of the laser rays which are reflected by the recursive reflecting members 4 and enter the half mirror 13 via the input region 2 with entry angles different from each other. The photoelectric conversion array outputs resultant signals in a time sequence.

In the above-mentioned configuration, a distance between the secondary light source 12 and the half mirror 13 is equal to a distance between the cylindrical lens 14 and the half mirror 13. These distance is referred to as a distance D. In the z-axis direction, the laser ray reflected by the recursive reflecting member 4 does not receive a reaction of the cylindrical lens 14, that is, remaining collimated, and reaches the light receiving device 15. On the other hand, in the direction in parallel to the displaying surface of the display unit d, the laser ray reflected by the recursive reflecting member 4 proceeds to the center of the cylindrical lens 14, that is, receiving a reaction of the cylindrical lens 14, and focuses on the light receiving device 15 which is arranged on the focus surface of the cylindrical lens 14.

Thereby, a distribution of light from the cylindrical lens 14 in the order of light strength is extended on the surface of the light receiving device 15. If the drawing tool such as a pen or a finger blocks the laser ray in the input region 2, the light strength in a corresponding part of the light distribution extended on the light receiving device 15 is weakened.

Figure 3:
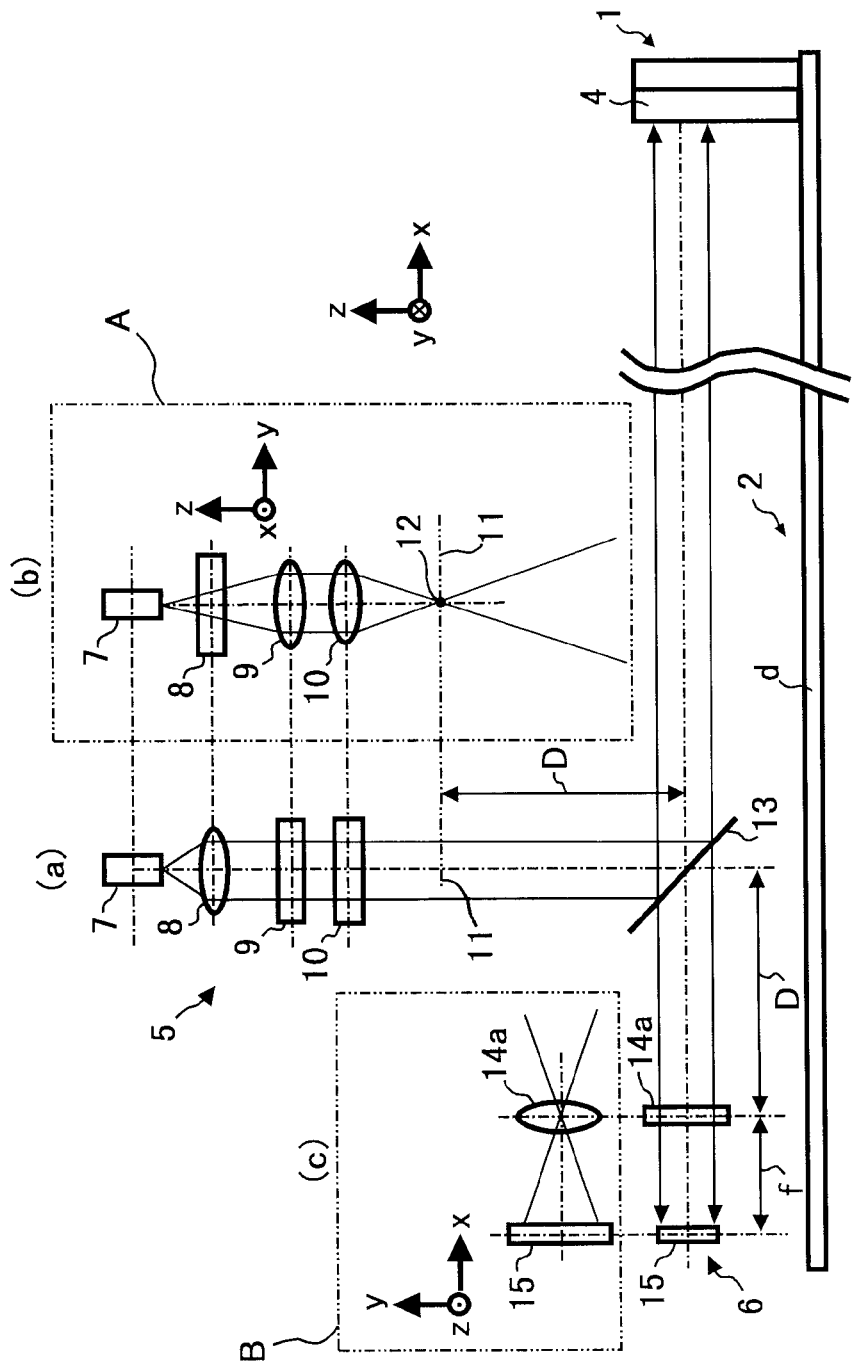
FIG. 3 is a schematic diagram for showing another optical unit of the coordinate input apparatus of FIG. 1.

The cylindrical lens 14 may be substituted by a regular light-gathering lens 14a having the same curvature on the concentric circles, as shown in FIG. 3. In this case, in the z-axis direction, the laser ray passing through the half mirror 13 receives a reaction of the light-gathering lens 14a, that is, being gathered and reaches the light receiving device 15. On the other hand, in the direction in parallel to the displaying surface of the display unit d, the laser ray passing through the half mirror 13 proceeds to the center of the light-gathering lens 14a, that is, receiving a reaction of the light-gathering lens 14a, and focuses on the light receiving device 15 which is arranged on the focus surface of the light-gathering lens 14a.

Thereby, a distribution of light in a fine-line shape in parallel to the y axis in the order of light strength is extended on the surface of the light receiving device 15. If the drawing tool such as a pen or a finger blocks the laser ray in the input region 2, the light strength in a corresponding part of the light distribution extended on the light receiving device 15 is weakened.

Figure 4:
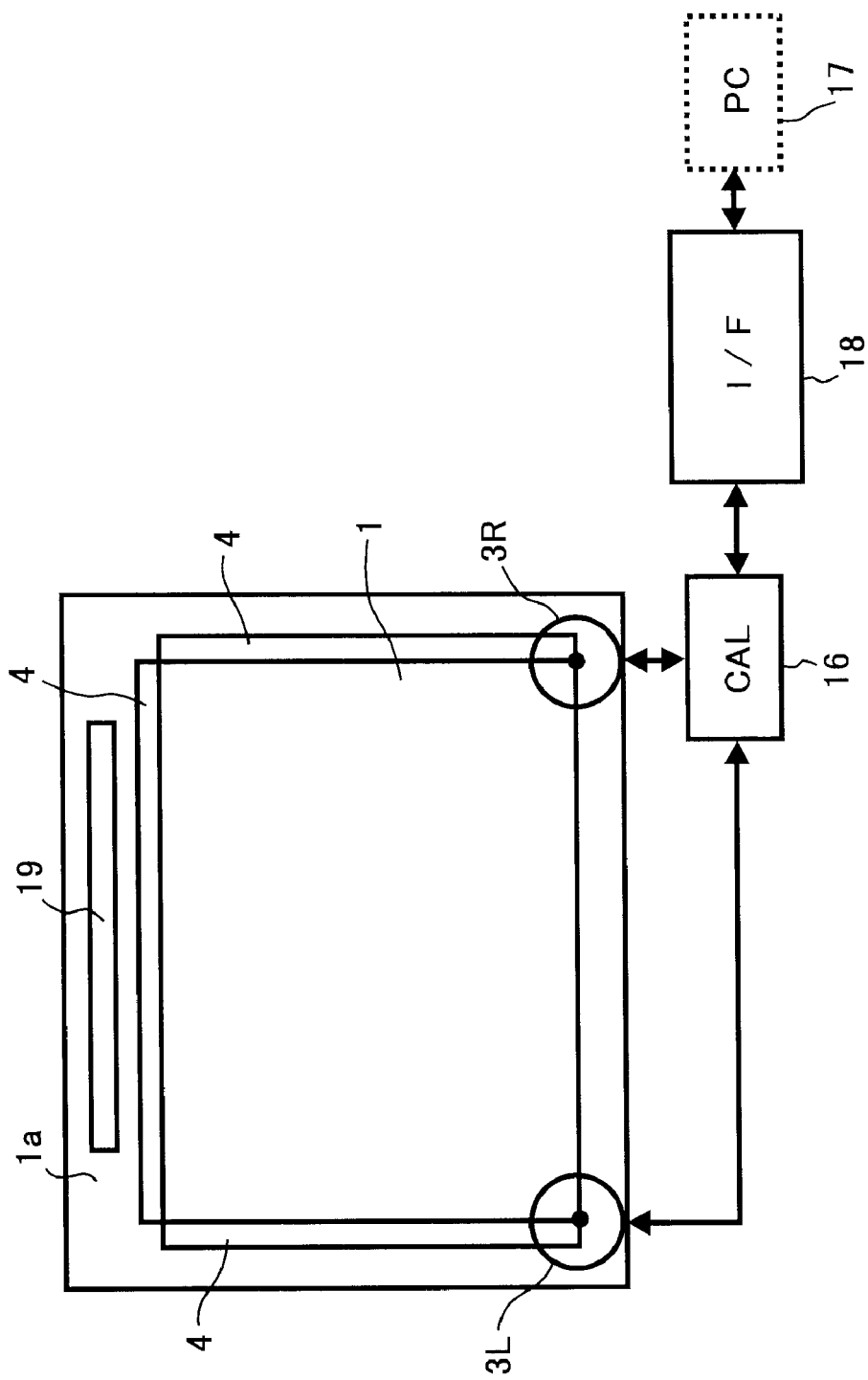
FIG. 4 is an illustration for explaining a drawing system including the coordinate input apparatus of FIG. 1.

FIG. 4 illustrates an exemplary configuration of a drawing system 100 including the coordinate input apparatus 1 according to the embodiment of the present invention. The drawing system 100 of FIG. 4 includes, in addition to the coordinate input apparatus 1, a calculating unit 16, an interface (I/F) unit 18, and a indicating unit 19. The calculating unit 16 calculates coordinates of x and y representing a position of the drawing tool such as a pen or a finger based on the signals output from the light receiving units 6 of the optical units 3L and 3R. The interface unit 18 outputs the signals representing the x and y coordinates calculated by the calculating unit 16 to a personal computer (PC) 17. The indicating unit 19 for indicating various kinds of information is provided on an upper part of the frame 1a which supports the recursive reflecting members 4.

Figure 5:
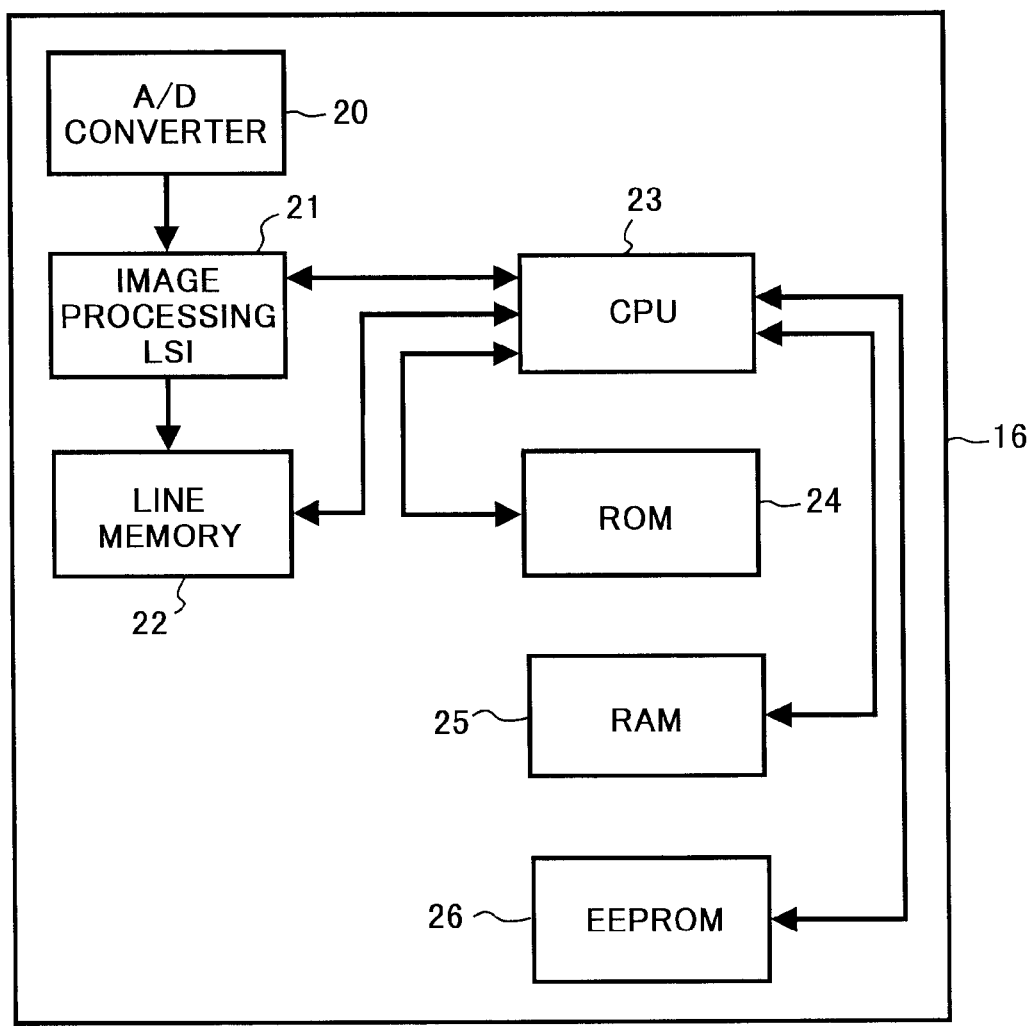
FIG. 5 is a block diagram of a calculating unit of the coordinate input apparatus of FIG. 1.

FIG. 5 shows a block diagram of the above-mentioned calculating unit 16. As shown in FIG. 5, the calculating unit 16 includes an A/D (analog-to-digital) converter 20, an image processing (IP) LSI (large scale integrated circuit) 21, a line memory 22, a CPU (central processing unit) 23, a ROM (read only memory) 24, a RAM (random access memory) 25, and an EEPROM (electrically erasable programmable ROM) 26. An analog signal output from the light receiving units 6 of the optical units 3L and 3R is input to the A/D converter 20 and is converted to a digital signal. Then, the image processing LSI performs a signal processing operation relative to the digital signal output from the A/D converter 20 and sends the processed digital signal to the line memory 22. The CPU 23 determines the coordinate position of the drawing tool in the input region 2 based on the image signal stored in the line memory 22 in accordance with the information from the ROM 24 and the RAM 25, and outputs the data representing the coordinate position to the personal computer 17 via the interfacing unit 18. After that, using such an output coordinate position, the personal computer 17 instructs the display unit d to display a track of movement of the drawing tool in the input region 2, allowing the user to use the display unit d as if it is a drawing board such as a blackboard.

Figure 6:
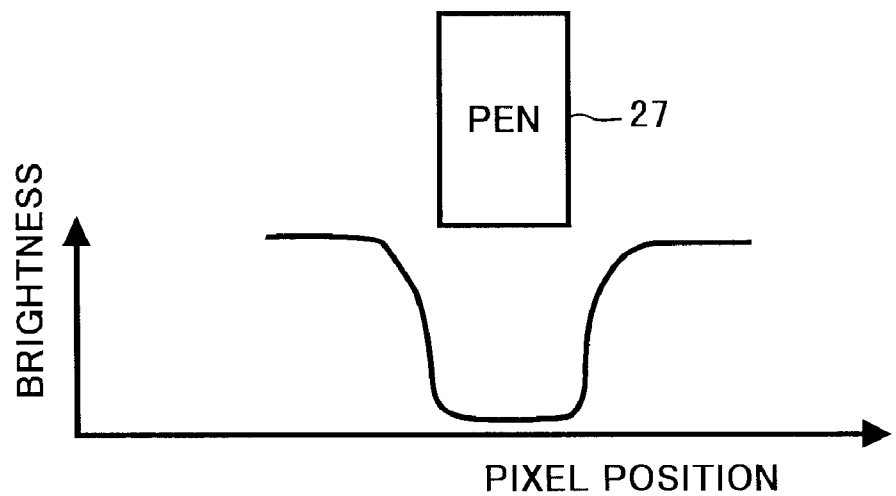
FIG. 6 is an illustration for explaining a relationship between a position of a pixel in a light receiving device and brightness of the pixel relative to an obstacle.
Figure 7:
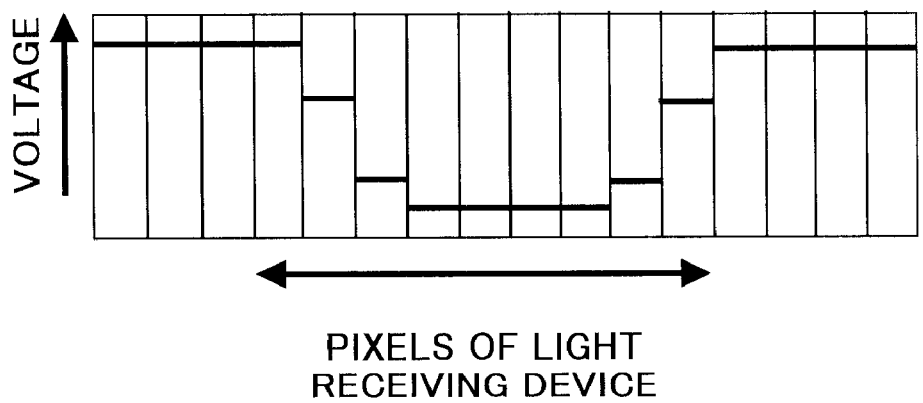
FIG. 7 is an illustration for explaining a relationship between a pixel and a voltage of the pixel relative to an obstacle.
Figure 8:
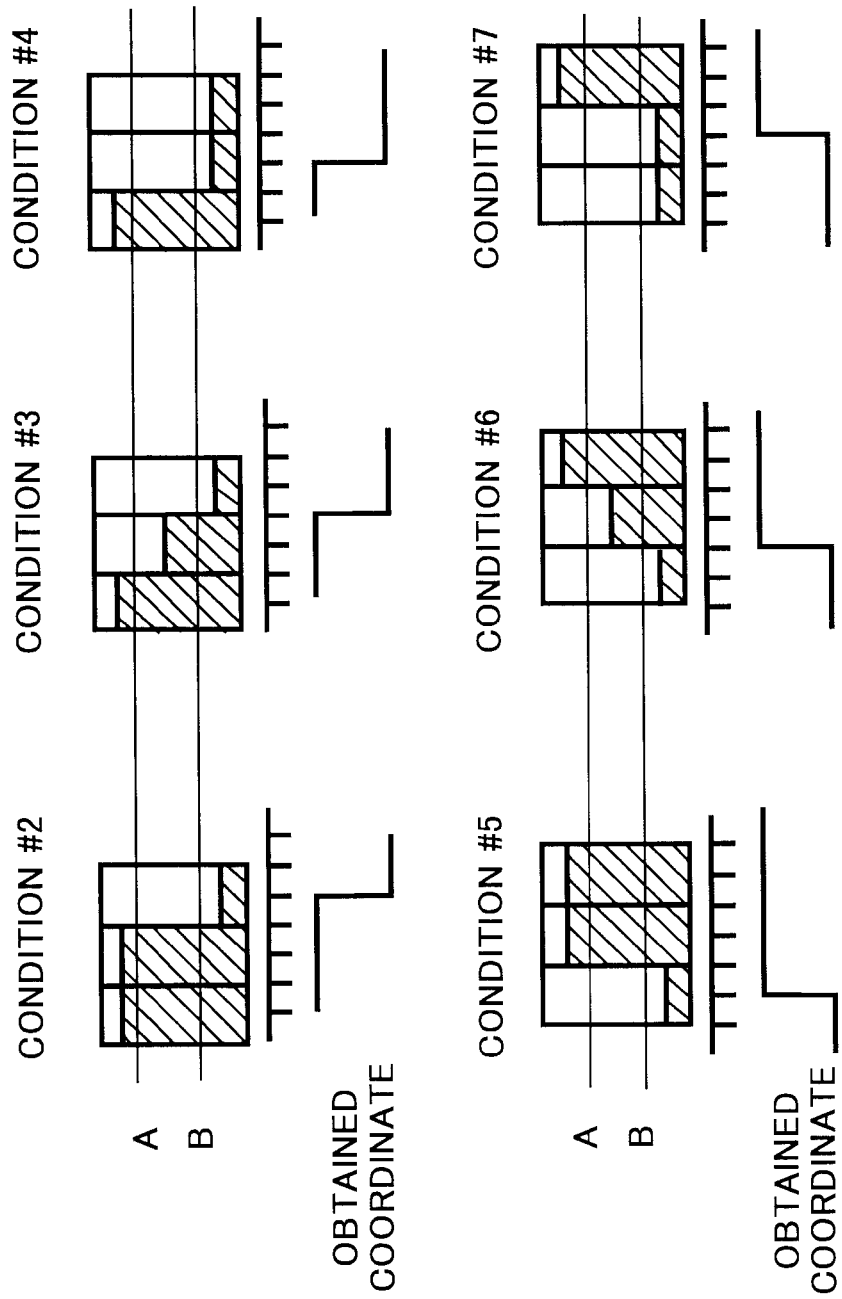
FIG. 8 is an illustration for explaining combinations of states of three pixels relative to two threshold levels, making eight different conditions for determining a pixel block as white or black.

Referring now to FIGS. 6–8, an exemplary operation for calculating the coordinate position of an obstacle (i.e., a pen)

in the input region 2 performed by the calculating unit 16 is explained. FIG. 6 shows an exemplary relationship between a position of a pixel in the light receiving device 15 and a brightness of the pixel relative to an obstacle 27 (i.e., a pen), wherein the obstacle 27 is placed in the input region 2 and several pixels corresponding to the position of the obstacle 27 are darkened. Each of the pixels corresponds to each of the plurality of the photoelectric conversion cells included in the photoelectric conversion array of each light receiving device 15. FIG. 7 shows an exemplary relationship between a pixel and a voltage, wherein a voltage represents an image signal photoelectric-converted from the laser ray by the photoelectric device and is output from the light receiving device 15.

A line image signal output from each of the light receiving devices 15 of the optical units 3L and 3R represents a signal voltage corresponding to a brightness of each pixel of the light receiving devices 15. This line image signal is A/D-converted by the A/D converter 20 and is then subjected to the image processing operation performed by the image processing LSI 21. After that, the data of the line image signal is stored in the line memory 22. The CPU 23 reads the line image signal stored in the line memory 22 and determines a coordinate position at which the laser ray is blocked by the obstacle 27 in the input region 2.

In this case, the position of each photoelectric conversion cell (i.e., each pixel position) of the light receiving device 15 corresponds to the coordinate on the input region 2 and to the address of the line memory 22 at which the data of the pixel signal is stored. Therefore, a basic resolution of the coordinates obtained by the calculation with the CPU 23 is determined by a number of the photoelectric conversion cells (i.e., a number of the pixels) included in the light receiving device 15. The obstacle 27 is large enough relative to such a basic resolution and is capable of blocking the laser rays of a plurality of pixels.

More specifically, the CPU 23 is provided with first and second light amount references for comparing with each pixel of the image signal stored in the line memory 22 so as to determine a coordinate at which the laser ray is blocked by the obstacle 27 in the input region 2 for each of the optical units 3L and 3R, wherein the first light amount reference has less light amount than the second light amount reference. In particular, the CPU 23 compares each value of the present pixel, the previous pixel, and the following pixel with each of the first and second light amount references, and obtains the above-mentioned coordinate of the light blockage by the obstacle 27 in the input region 2 under each of the eight different conditions below described with reference to FIG. 8. That is, in this operation, the CPU 23 focuses attention on three portions of the image signal stored in the line memory 22; a portion correspond to an area blocked by the obstacle 27, a pixel around one of boundary areas between the light-blocked area and two non-light-blocked areas sandwiching the light-blocked area, and a pixel on the other one of the boundary areas. That is, the CPU 23 compares signals of a pixel (i.e., the present pixel) in the image signal stored in the line memory 22 and two pixels (i.e., the previous and following pixels) to the first and second light amount references, wherein the previous and following pixels correspond to the pixels left and right, respectively, relative to the present pixel in the stream of the image signal flowing from the left to right.

A first condition (not shown) is defined where each of the previous, present, and following pixels has a brighter value than that of the second light amount reference. If this condition is obtained, the CPU 23 determines that the coordinate of the present pixel does not correspond to the coordinate of an edge of the obstacle 27.

A second condition (see FIG. 8) is defined where each of the previous and present pixels has a brighter value than that of the second light amount reference and the following pixel has a darker value that those of the first and second light amount references. If this condition is obtained, the CPU 23 determines that the coordinate of the present pixel does not correspond to the coordinate of an edge of the obstacle 27. In FIG. 8, a letter A indicates the level of the second light amount reference and a letter B indicates the level of the first light amount reference.

A third condition is defined where the previous pixel has a brighter value than that of the second light amount reference, the present pixel has a darker value that that of the second light amount reference, and the following pixel has a darker value that those of the first and second light amount references. If this condition is obtained, the CPU 23 determines that the coordinate of the present pixel corresponds to the coordinate between the center and the right edge of the obstacle 27.

A fourth condition is defined where the previous pixel has a brighter value than that of the second light amount reference, the present pixel has a darker value that that of the first light amount reference, and the following pixel has a darker value that those of the first and second light amount references. If this condition is obtained, the CPU 23 determines that the coordinate of the present pixel corresponds to the coordinate of the center of the obstacle 27.

A fifth condition is defined where the previous pixel has a darker value than those of the first and second light amount references and each of the present and following pixels has a brighter value that that of the second light amount reference. If this condition is obtained, the CPU 23 determines that the coordinate of the present pixel does not correspond to the coordinate of the center of the obstacle 27.

A sixth condition is defined where the previous pixel has a darker value than those of the first and second light amount references, the present pixel has a darker value than that of the second light amount reference, and the following pixel has a brighter value that that of the second light amount reference. If this condition is obtained, the CPU 23 determines that the coordinate of the present pixel corresponds to the coordinate between the left edge and the center of the obstacle 27.

A seventh condition is defined where the previous pixel has a darker value than those of the first and second light amount references, the present pixel has a darker value than that of the first light amount reference, and the following pixel has a brighter value that that of the second light amount reference. If this condition is obtained, the CPU 23 determines that the coordinate of the present pixel corresponds to the coordinate of the center of the obstacle 27.

An eighth condition is defined where each of the previous, present, and following pixels has a darker value than those of the first and second light amount references. If this condition is obtained, the CPU 23 determines that the coordinate of the present pixel does not correspond to the coordinate of an edge of the obstacle 27.

Since the coordinate on the input region 2 and the pixel position of the light receiving device 15 correspond with each other, the CPU 23 can obtain the coordinate simply by reading the address of the line memory 22 at which the present pixel is stored. With this operation, the CPU 23 can obtain the coordinate of an edge of an obstacle at a resolution twice of the number of pixels.

Figure 9:
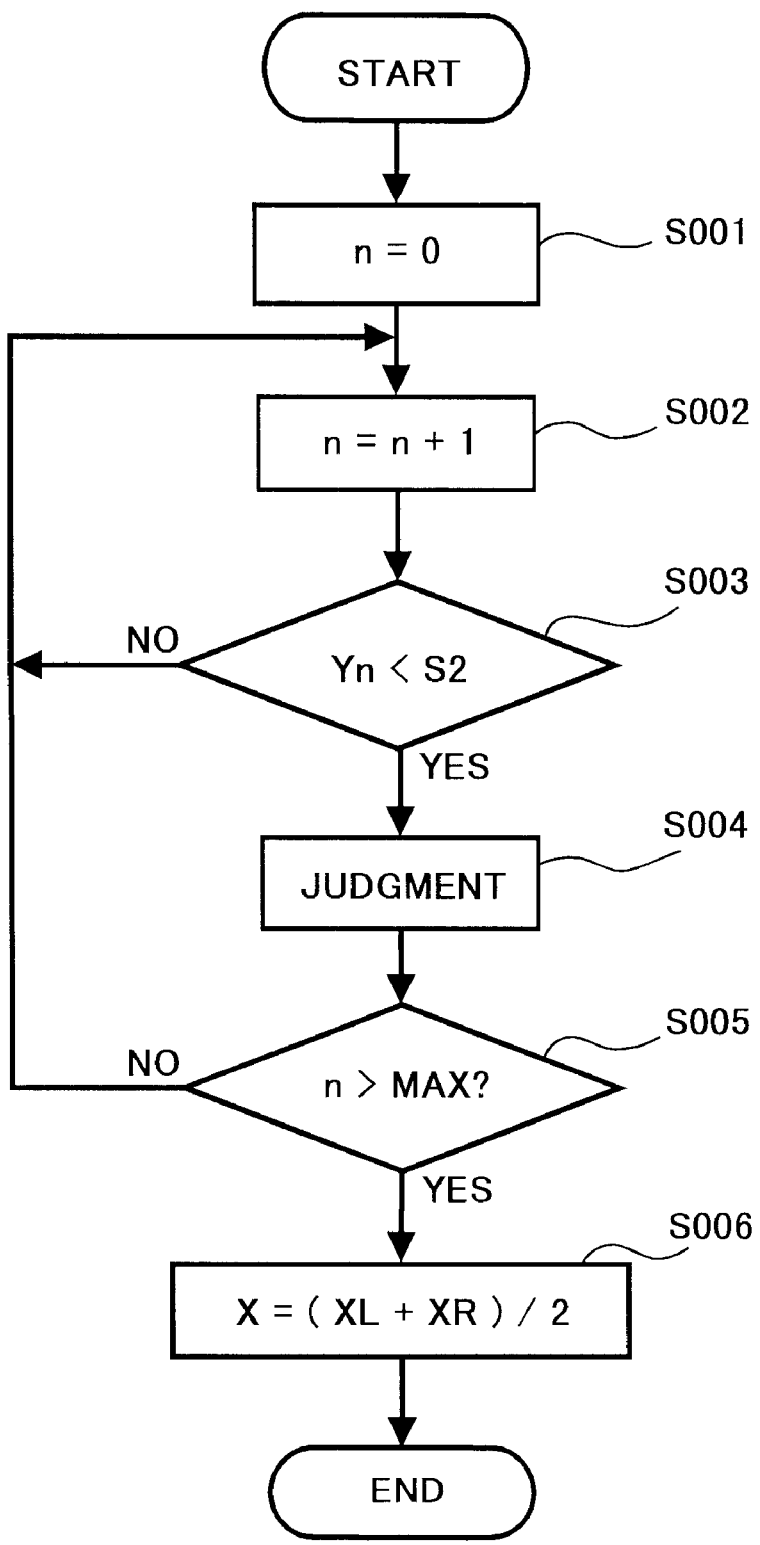
FIG. 9 is a flowchart of a coordinate calculation performed by the coordinate input apparatus of FIG. 1.

FIG. 9 shows an exemplary flow of the coordinate calculation performed by the calculating unit 16. In the flow of the coordinate calculation of FIG. 9, the first and second light amount references are referred to as S1 and S2, respectively. As shown in FIG. 9, when the CPU 23 starts the coordinate calculation, it sets a pixel number n to 0 in Step S001 and subsequently increments the pixel number n by 1 in Step S002. Then, in Step S003, the CPU 23 compares a pixel signal $Y_n$ of the nth pixel stored in the line memory 22 with the second light amount reference S2 to judge whether the pixel signal $Y_n$ is smaller than the second light amount reference S2, wherein the pixel signal $Y_n$ represents a voltage corresponding to the light amount of the nth pixel. If the pixel signal $Y_n$ is not smaller than the second light amount reference S2 and the judgement result is NO, the process returns to Step S002 to repeat the processes of the increment of n and the judgement of $Y_n$<S2 until the judgement of $Y_n$<S2 becomes true.

If $Y_n$<S2 becomes true and the judgement result is YES, the process proceeds to Step S004 and the CPU 23 performs the coordinate calculation based on the pixel signal voltage $Y_n$ that represents the present pixel of the image signal stored in the line memory 22, the pixel signal voltage $Y_{(n-1)}$ that represents the previous (left) pixel relative to the present pixel, the pixel signal voltage $Y_{(n+1)}$ that represents the following (right) pixel relative to the present pixel, and the first and second light amount references S1 and S2. As a result of this coordinate calculation, the CPU 23 outputs a coordinate XL representing the left edge of the obstacle 27, a coordinate XR representing the right edge of the obstacle 27, and a coordinate X representing the position of the obstacle 27.

More specifically, the CPU 23 performs the judgements in Step S004 in the following ways, wherein a is a proportionality constant:

(a) if $Y_{(n-1)}$>S2, S2>$Y_n$>S1, and $Y_{(n+2)}$<S1 are true, XL equals to the proportionality constant a multiplied by (n+0.5), (b) if $Y_{(n-1)}$>S2, $Y_n$<S1, and $Y_{(n+1)}$<S1 are true, XL equals to the proportionality constant a multiplied by n, (c) if $Y_{(n-1)}$<S1, S2>$Y_n$>S1, and $Y_{(n+1)}$>S2 are true, XR equals to the proportionality constant a multiplied by (n−0.5), (d) if $Y_{(n-1)}$<S1, $Y_n$<S1, and $Y_{(n+1)}$>S2 are true, XR equals to the proportionality constant a multiplied by n, and (e) if $Y_{(n-1)}$<S1, $Y_n$<S1, and $Y_{(n+1)}$<S1 are true, XR equals to the proportionality constant a multiplied by (n−0.5), no judgement is made to XL, XR, nor X.

Then, in Step S005, the CPU 23 checks whether the pixel number n is the maximum number (i.e., 16). If the pixel number n is not the maximum number and the check result of Step S005 is NO, the process returns to Step S002 to repeat the procedure described above. But, if the pixel number n is the maximum number and the check result of Step S005 is YES, the process proceeds to Step S006 and the CPU 23 calculates the mean value of XL and XR to determine the coordinate X=(XL+XR)/2 of the obstacle 27. Then, the process ends.

In the calculation performed in Step S006 where the mean value of XL and XR is calculated, a resolution achieved will be equivalent to ¼ of a pixel, when a number of the pixels from one edge of the obstacle 27 to the other edge thereof is ½ multiplied by an odd number. In this calculation having such a resolution, the CPU 23 can calculate the coordinate of a relatively large obstacle in an accurate manner. In this case, it is also possible to increase the resolution up to four times of the number of pixels to be calculated.

Alternatively, if the number of the light amount references are increased to three, the resolution can be increased up to six times of the pixel numbers to be calculated. Furthermore, if the number of the light amount references are increased to four, the resolution can be increased up to eight times of the pixel numbers to be calculated.

After the above-described calculation of FIG. 9, the CPU 23 reads a reference table previously stored in the ROM 24 and calculates the x- and y-coordinate values X and Y of the light blocking obstacle 27 in the input region 2 based on the above-obtained coordinate of the obstacle 27 for each of the optical units 3L and 3R, using a measuring method of triangulation. The reference table represents a relationship between the pixel positions on the CCD of the light receiving unit 6 included in each of the optical units 3L and 3R and the angles of the optical units 3L and 3R.

In this way, the coordinate input apparatus 1 is provided with the calculating unit 16 that determines the center between the both edges of the light-blocked signal portion as an appropriate coordinate of the light-blocked position. Therefore, the coordinate input apparatus 1 can accurately determine the coordinate of obstacle in the input region.

Further, the coordinate input apparatus 1 calculates the coordinate based on the two predetermined light amount references and three successive pixels under the eight different conditions of brightness of these three successive pixels, and determines the coordinate of the center of a pixel. Therefore, it is possible to increase the resolution without the needs of increasing the number of pixels. That is, the coordinate input apparatus 1 can be made at a relatively low cost.

Further, the coordinate input apparatus 1 has an arrangement in which the order of the photoelectric conversion arrays included in the light receiving unit 6 corresponds to the coordinates of the input region 2. Thus, the coordinate input apparatus 1 can automatically perform the coordinate calculation by reading the addresses of the pixels stored in the line memory 22. As a result, the procedure for calculating the coordinate can be made in a simple and low cost manner.

Figure 10:
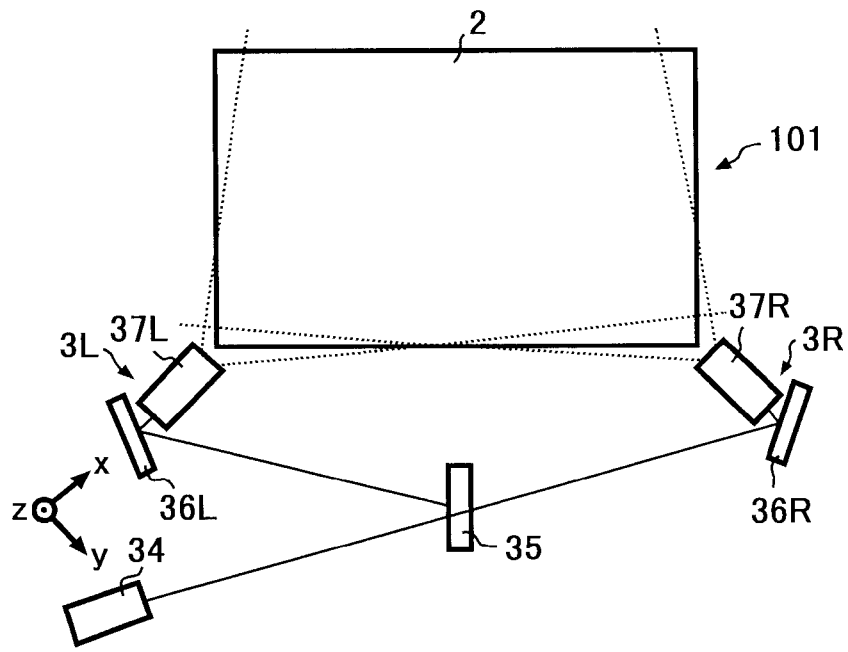
FIG. 10 is an illustration for explaining a configuration of another coordinate input apparatus having a combined light source.

In addition, the light sources 5 of the optical units 3L and 3R may alternatively be a combined light source. FIG. 10 shows an exemplary configuration of another coordinate input apparatus 101 having a combined light source 34. As shown in FIG. 10, the light emitted from the light source 34 is divided by a half mirror 35 into the light proceeding to the optical unit 3L and the light proceeding to the optical unit 3R. In the optical unit 3L, the light reflected by the half mirror 35 is reflected by a mirror 36L and proceeds to a light-gathering optical system 37L. The light-gathering optical system 37L reforms the light from the mirror 36L into the light in a deltaic shape and emits it to the half mirror 13 (FIG. 2). In the optical unit 3R, the light passing through the half mirror 35 is reflected by a mirror 36R and proceeds to a light-gathering optical system 37R. The light-gathering optical system 37R reforms the light from the mirror 36R into the light in a deltaic shape and emits it to the half mirror 13 (FIG. 2).

Although the coordinate input apparatus 1 is provided with the two optical units 3L and 3R, it may be provided with three or more optical units as an alternative. Also, in the coordinate input apparatus 1, the optical units 3L and 3R are mounted in the bottom side of the frame 1a but they may be mounted in an upper side thereof.

Figure 11:
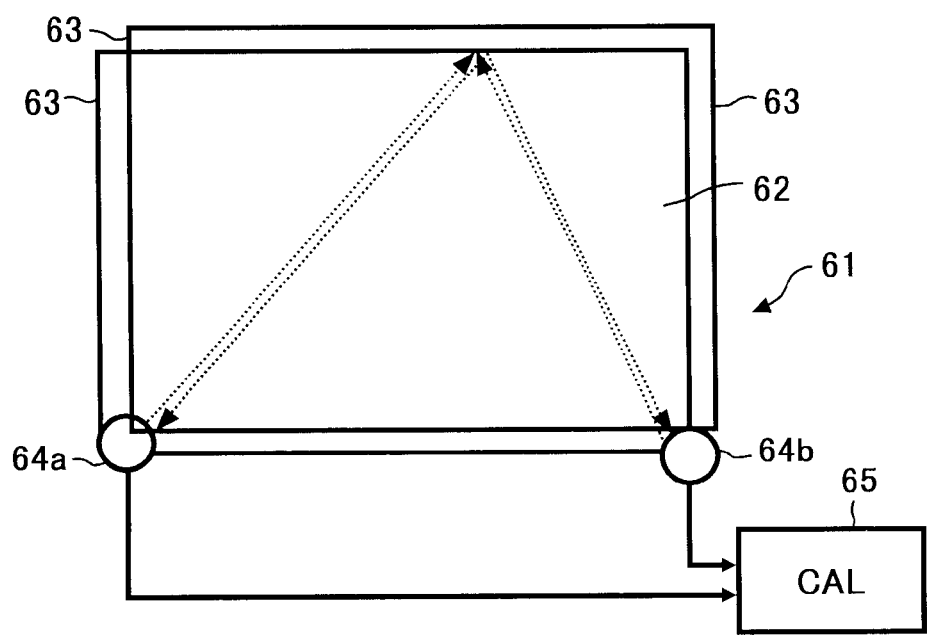
FIG. 11 is an illustration for explaining a configuration of a background coordinate input apparatus having a combined light source.

Further, the present invention can be applied to another coordinate input apparatus 61 which is described in Japanese Laid-Open Patent Publication No. 9-91094(1997) and of which configuration is as shown in FIG. 11. As shown in FIG. 11, the coordinate input apparatus 61 is provided with light scanners 64a and 64b arranged at positions different from each other on a touch-panel 62 and each of which emits a light ray in parallel to the touch-panel 62 with a rotational movement with the center at which the corresponding light scanner locates. Each of the light scanners 64a and 64b receives the light ray recursively reflected by reflectors 63 mounted on the touch-panel 62. The coordinate input apparatus 61 further includes a calculating unit 65 for calculating the coordinate of a light-blocked position based on the result of the light receiving operation when the light ray running on the touch-panel 62 is blocked. In this coordinate input apparatus 61, the calculating unit 65 may be replaced with the calculating unit 16 according to the present invention.

Figure 12:
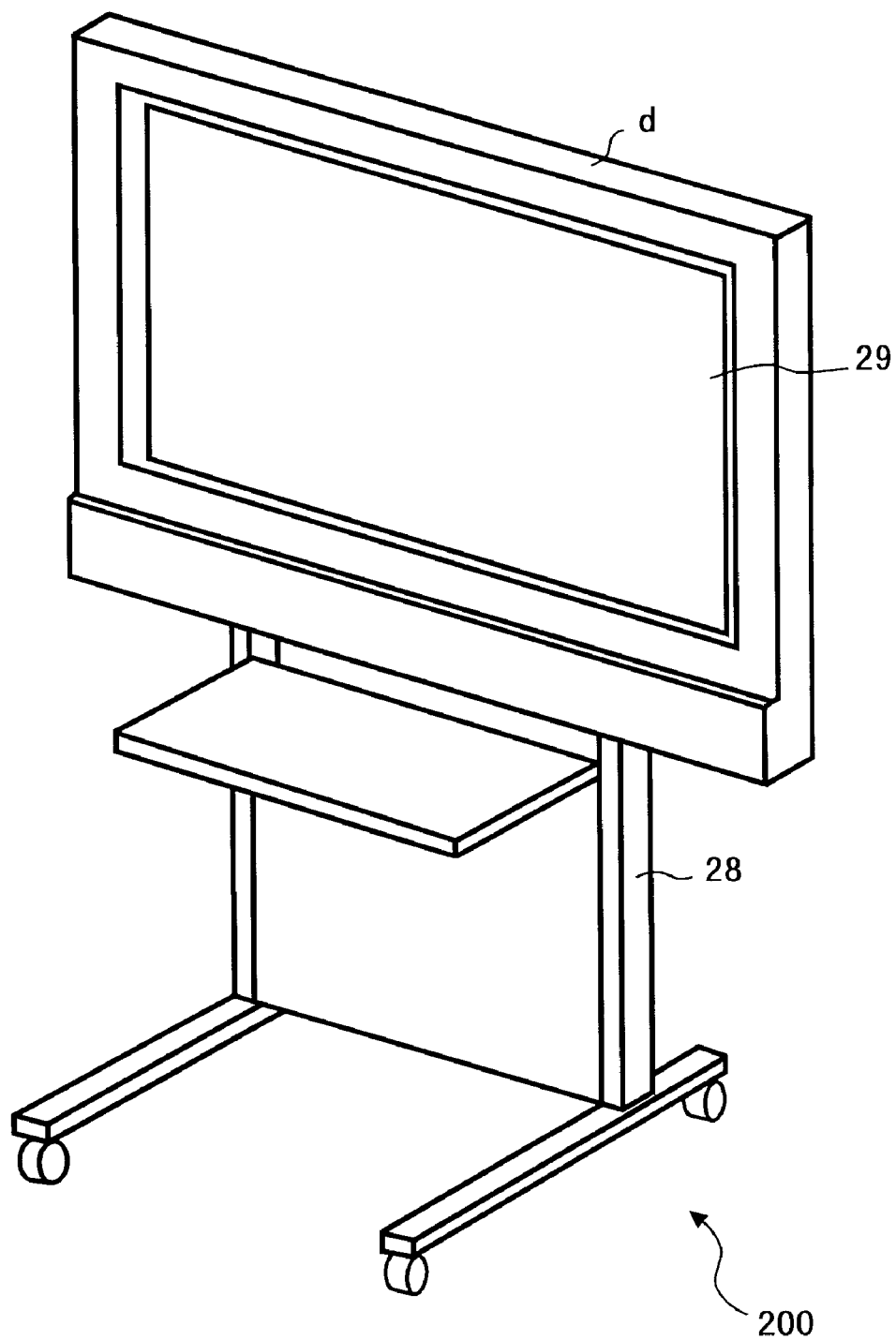
FIG. 12 is an illustration of an electronic copyboard system including the coordinate input apparatus of FIG. 1.

Next, an application of the coordinate input apparatus 1 to be mounted on an exemplary electronic copyboard system is explained with reference to FIG. 12. In FIG. 12, an electronic copyboard system 150 is illustrated. The electronic copyboard system 150 includes the display unit d, a supporting frame 28 for supporting the display unit d, and a touch-panel 29 mounted on the display surface of the display unit d. The coordinate input apparatus 1 is supported by the supporting frame 28 and is mounted in front of the touch-panel 29.

Figure 13A:
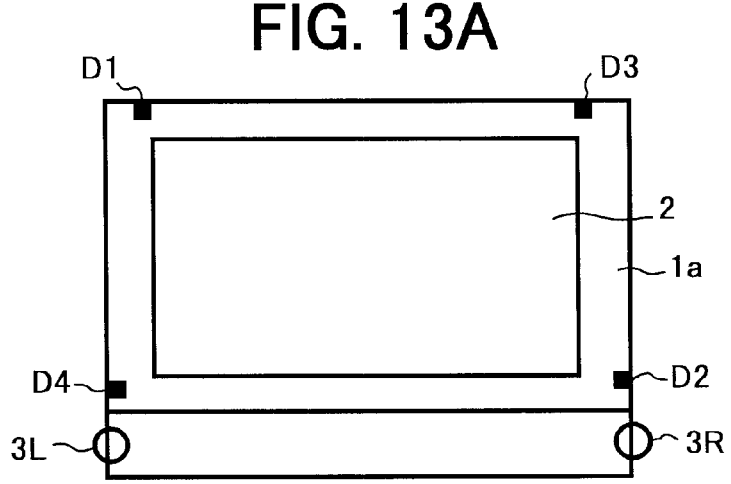
FIGS. 13A and 13B are illustrations for explaining black masks D1–D4 used in the coordinate input apparatus of FIG. 1.
Figure 13B:
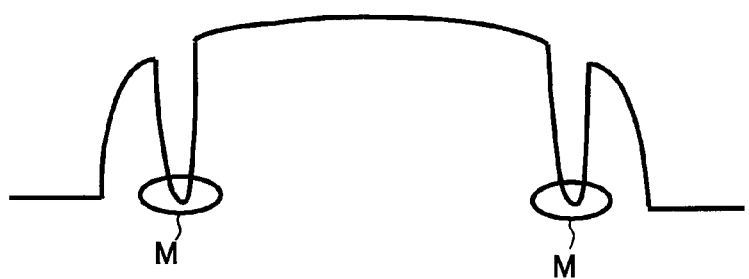

The display unit d includes a 50-inch plasma display panel, for example, having a 1108- by 628-mm effective display area, a 1160- by 690-mm effective obstacle-detecting area in which a coordinate of an obstacle such as a finger or a pen can be detected, and a 1- to 10-mm effective height on the touch-panel 29 within which a coordinate of an obstacle such as a finger or a pen can be detected. As shown in FIG. 13A, the frame 1a is provided at the corner thereof (inside the recursive reflecting members 4) with black masks D1 and D2 for specifying the limits of the effective obstacle-detecting area of the optical unit 3L and black masks D3 and D4 for specifying the limits of the effective obstacle-detecting area of the optical unit 3R. In the example being explained, a disturbance light is specified to be 1500 lux or lower. The optical units 3L and 3R are mounted around the perimeter of the input region 2 with a predetermined angle so that the light from the optical units 3L and 3R are efficiently reflected, in particular, at the corner where the recursive reflecting members 4 face to each other. As shown in FIG. 13B, when the black masks D1–D4 are detected, the voltage levels fall to a predetermined level and, therefore, an effective obstacle-detecting area is specified by the positions of these black masks, wherein the predetermined voltage level for the black masks are included in the image signal from the light receiving unit 6.

In the optical units 3L and 3R, the laser ray source 7 of the light source 5 includes a laser diode (LD) capable of emitting a red-colored laser ray having wavelengths in the 650 mm range, a light-producing time of 5 ms, and a light-producing cycle of 10 ms. The light receiving device 15 of the light receiving unit 6 includes a CCD (charge-coupled device) capable of reading 2160 pixels, having a 10-ms reading cycle and a 5-ms reading time.

Figure 14:
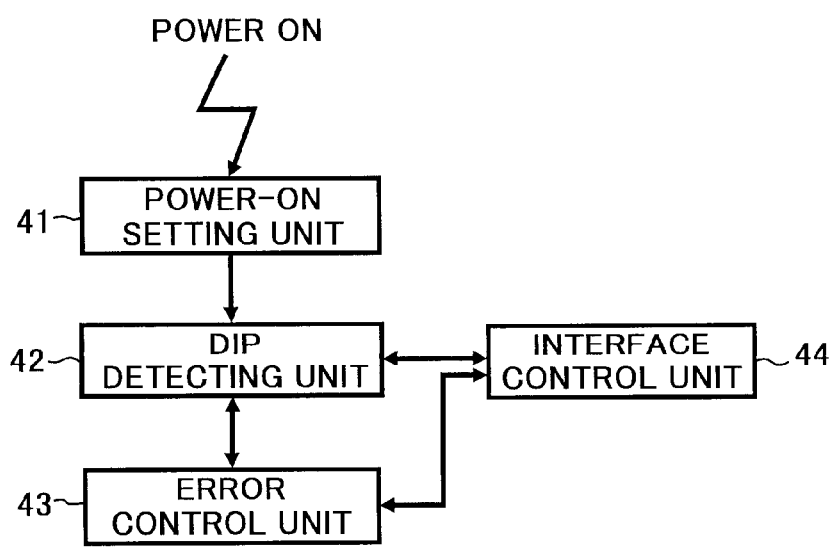
FIG. 14 is a block diagram of functions performed by a CPU, a ROM, a RAM, and an EEPROM of the calculating unit.

FIG. 14 shows a block diagram of functions performed by the CPU 23, the ROM 24, the RAM 25, and the EEPROM 26 of the calculating unit 5. The block diagram of FIG. 14 includes a power-on setting unit 41, a dip detecting unit 42, an error control unit 43, and an interface control unit 44. The power-on setting unit 41 performs various initial hardware-settings at power-on, controls the interface unit 18, and runs self-diagnostic checks. The dip detecting unit 42 detects a dip in a line image signal sent from the optical units 3L and 3R and performs the calculation of x, y coordinates of the position of the obstacle 27. The error control unit 43 controls various errors. The interface control unit 44 performs input and output operations relative to the driver 17.

Figure 15A:
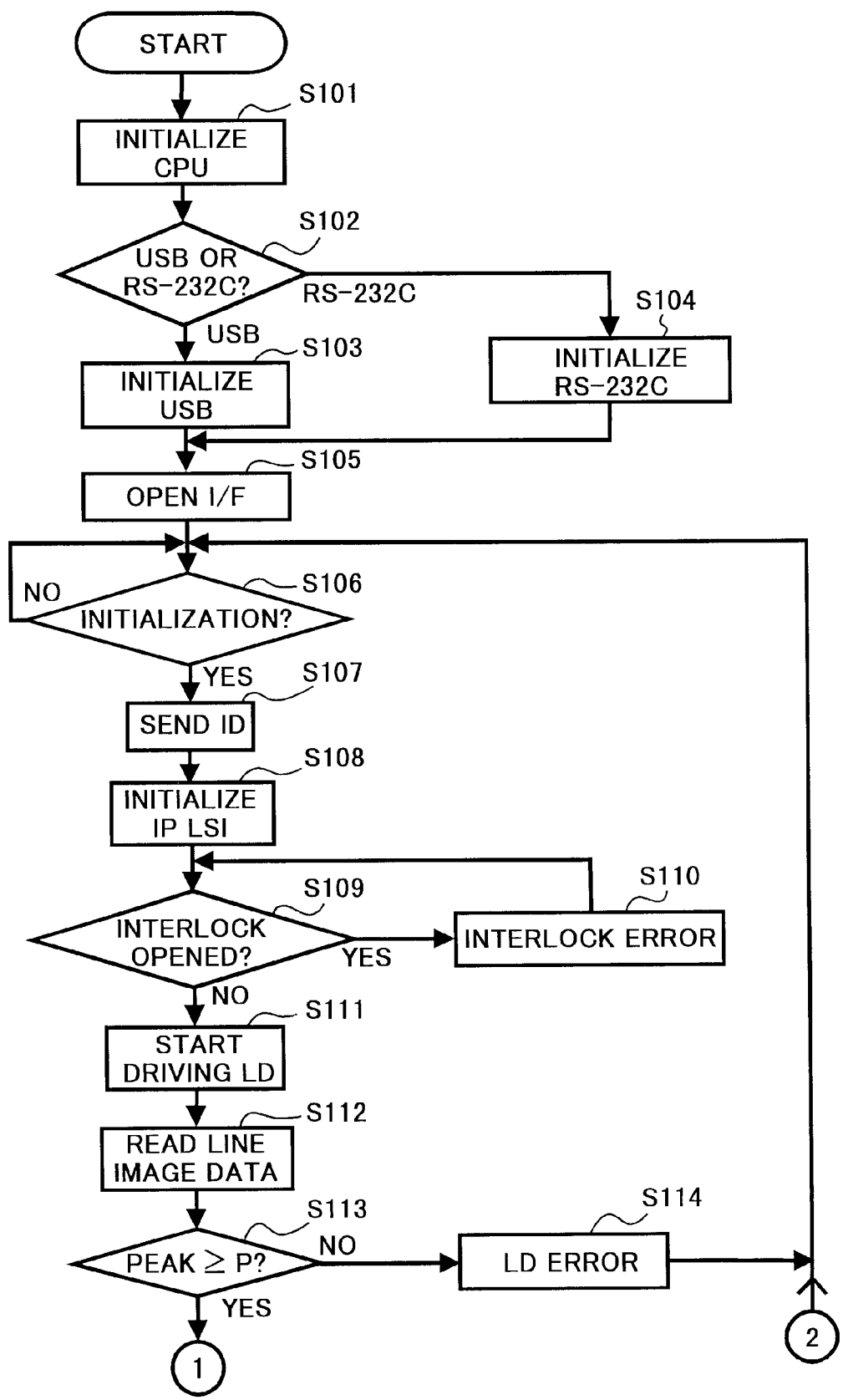
FIGS. 15A and 15B are flowcharts of a power-on setting operation performed by a power-on setting unit.
Figure 15B:
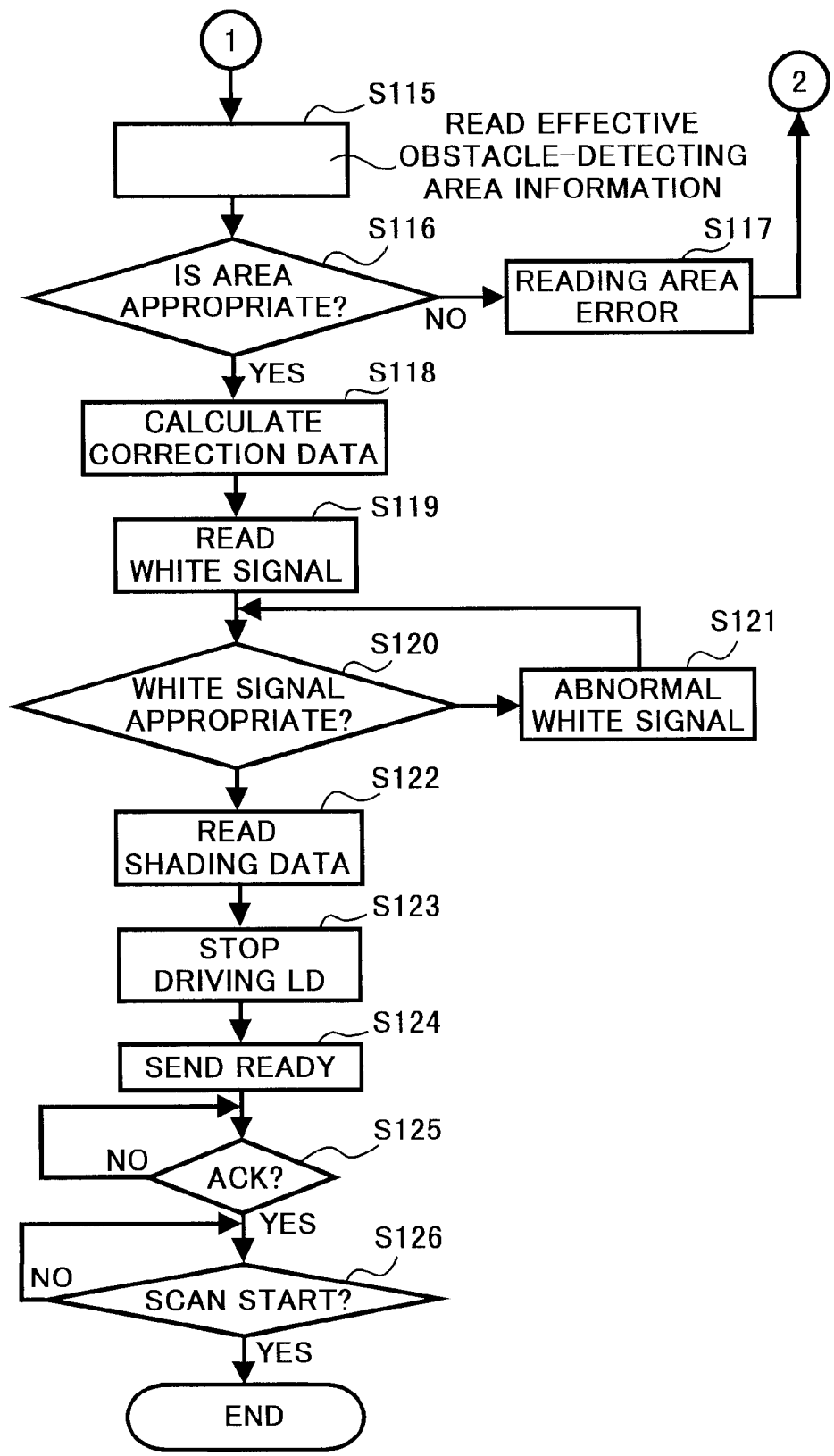

Referring to FIGS. 15A and 15B, an exemplary procedure of operations performed by the power-on setting unit 41. In FIG. 15A, at power-on or a reset, the power-on setting unit 41 starts the power-on setting operation. In Step S101, the power-on setting unit 41 initializes the CPU 23. Then, the power-on setting unit 41 checks if the interface unit 18 is a USB interface or a RS-232C interface in Step S102. If it is a USB interface, the power-on setting unit 41 initializes the interface unit 18 in Step S103, or, if it is an RS-232C interface, the power-on setting unit 41 initializes the interface unit 18 in Step S104. After that, the power-on setting unit 41 sets the interface 18 to open relative to the driver 17.

Then, in Step S106, the power-on setting unit 41 continuously checks if the interface unit 18 receives an initialization signal from the driver 17 until it receives the signal. Upon receiving the initialization signal, the power-on setting unit 41 sends an ID (identification) code to the driver 17 via the interface unit 18 and performs the self-diagnostic hardware checks, in Step S107. Then, the power-on setting unit 41 initializes the image processing LSI 21 in Step S108, and checks if at least one of interlock mechanisms (not shown) of the optical units 3L and 3R are open in Step S109. The interlock mechanism is opened or closed by an open or close action of the casings 3a (see FIG. 1) of the optical units 3L and 3R.

If the interlock mechanism is opened and the check result of Step S109 is YES, the power-on setting unit 41 determines as that the interlock mechanism is in an interlock error, in Step S110. After Step S110, the process returns to Step S109 to repeat the interlock check which will be performed until the interlock mechanism is closed. When the interlock mechanism is closed and the check result of Step S109 is NO, the power-on setting unit 41 starts to drive the LD of the light source 5 in Step S111. Then, in Step S112, the power-on setting unit 41 reads a line of image data from the CCD of the light receiving unit 6 via the A/D converter 20 and the image processing LSI 21. In Step S113, the power-on setting unit 41 determines if a peak value of the read image data is smaller than a predetermined value A. If the peak value of the read image data is not greater than the predetermined value A and the check result of Step S113 is NO, the process proceeds to Step S114 and the power-on setting unit 41 determines as that an LD error occurs in the light source 5. After Step S114, the process returns to Step S106 to repeat the procedure from the initialization. When the light from the LD does not impinge on the recursive reflecting members 4 and, therefore, the light receiving unit 6 does not receive the light, the power-on setting unit 41 also determines this case as an LD error of the light receiving unit 5.

If the peak value of the read image data is greater than the predetermined value P and the check result of Step S113 is YES, the process proceeds to Step S115 (FIG. 15B). In Step S115, the power-on setting unit 41 determines as that the level of the read image data is appropriate and reads an image signal, including the information of the effective obstacle-detecting area, from the light receiving unit 6 via the A/D converter 20 and the image processing LSI 21. Then, in Step S116, the power-on setting unit 41 checks if the effective obstacle-detecting area of the optical units 3L and 3R is within the effective obstacle-detecting area of the CCD of the light receiving unit 6. As described earlier, the frame 1a is provided at the corner thereof (inside the recursive reflecting members 4) with the black masks D1 and D2 for specifying the limits of the effective obstacle-detecting area of the optical unit 3L and the black masks D3 and D4 for specifying the limits of the effective obstacle-detecting area of the optical unit 3R, as shown in FIG. 13A. Also, as shown in FIG. 13B, when the black masks D1–D4 are detected, the voltage levels fall to a predetermined level and, therefore, an effective obstacle-detecting area is specified by the positions of these black masks, wherein the predetermined voltage level for the black masks are included in the image signal from the light receiving unit 6. For this purpose, the image signal from the CCD of the light receiving unit 6 includes two of the black mask values M, corresponding to the black masks D1 and D2 and another two of the black mask values M corresponding to the black masks D3 and D4, as the information of the effective obstacle-detecting area of the CCD of the light receiving unit 6.

That is, in Step S116, the power-on setting unit 41 performs the check in. Step S116 by determining if the two black mask values M, corresponding to the black masks D1 and D2 or D3 and D4, are included in the one-line image signal from the CCD of the light receiving unit 6. If the two black mask values M are not included in the one-line image signal and the check result of Step S116 is NO, the power-on setting unit 41 determines as that the effective obstacle-detecting area of the optical units 3L and 3R is not within the effective obstacle-detecting area of the CCD of the light receiving unit 6 and the process proceeds to Step S117. In Step S117, the power-on setting unit 41 determines that a reading area error occurs, and returns to Step S106 so as to repeat from the initialization process.

Then, the process proceeds to Step S118 if the power-on setting unit 41 determines that the two black mask values M are included in the one-line image signal and the check result of Step S116 and consequently determines that the effective obstacle-detecting area of the optical units 3L and 3R is within the effective obstacle-detecting area of the CCD of the light receiving unit 6. In Step S118, the power-on setting unit 41 compares the one-line image signal including the two black mask values M as the information of the effective obstacle-detecting area with a reference value previously stored in the ROM 24 so as to calculate a displacement correction coefficient for correcting for the displacements of the optical units 3L and 3R in angle, a reduction ratio, and a CCD position.

Figure 16:
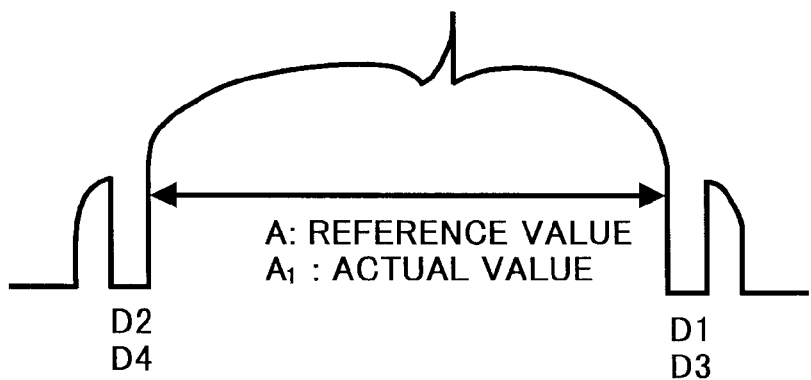
FIG. 16 is an illustration for explaining the number of the pixels laying between two black mask values M, corresponding to black masks D1 and D2.

In this case, the power-on setting unit 41 calculates a count $A_1$ of the pixels laying between the two black mask values M, corresponding to the black masks D1 and D2, included in the one-line image signal from the CCD of the light receiving unit 6 of the optical unit 3L, as shown in FIG. 16. After that, the power-on setting unit 41 calculates a reduction ratio S by calculating a ratio of the count $A_1$ to a reference value A prestored in the ROM 24. That is, the reduction ratio S is made equal to the count $A_1$ divided by the reference value A. The reference value A is a reference count of pixels existing between the two black mask values M included in the image signal from the CCD of the light receiving unit 6 of the optical unit 3L.

As in the same manner, the power-on setting unit 41 calculates a count $A_1\&_{quot;}$ of the pixels laying between the two black mask values M, corresponding to the black masks D3 and D4, included in the one-line image signal from the CCD of the light receiving unit 6 of the optical unit 3R. After that, the power-on setting unit 41 calculates a reduction ratio $S_1$ by calculating a ratio of the count $A_1\&_{quot;}$ to a reference value $A\&_{quot;}$ prestored in the ROM 24. In this case, the reduction ratio $S_1$ is made equal to the count $A_1\&_{quot;}$ divided by the reference value $A\&_{quot;}$. The reference value $A\&_{quot;}$ is a reference count of pixels existing between the two black mask values M included in the image signal from the CCD of the light receiving unit 6 of the optical unit 3R.

Figure 17A:
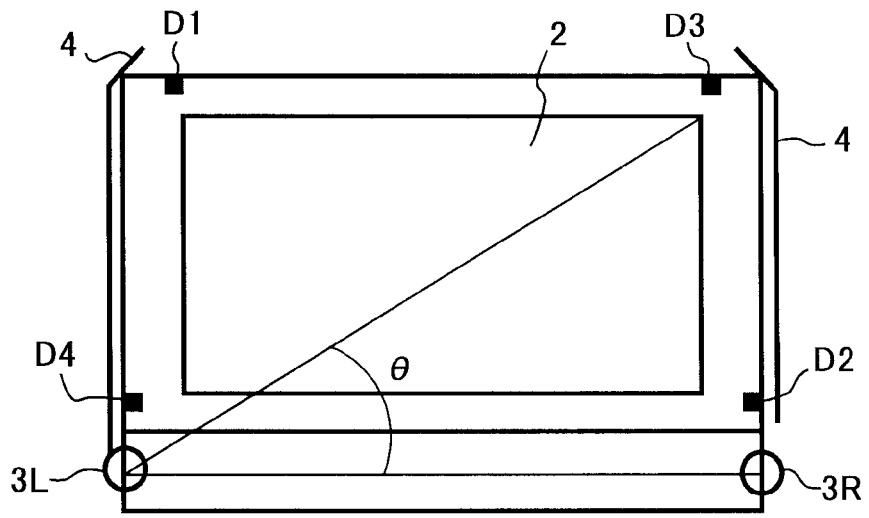
FIGS. 17A and 17B are illustrations for explaining the number of the pixels laying between two black mask values M, corresponding to black masks D2 and D3.

Further, as shown in FIG. 17A, the power-on setting unit 41 calculates a count $T_1$ of the pixels laying between the two black mask values M, corresponding to the black masks D2 and D3, included in the one-line image signal from the CCD of the light receiving unit 6 of the optical unit 3L. After that, the power-on setting unit 41 calculates an actual mounting angle $\theta_1$ based on a reference value T prestored in the ROM 24, the above-mentioned reduction ration S, and a reference angle $\theta$ prestored in the ROM 24. In this case, the power-on setting unit 41 uses an equation, $$\theta_1 = ((T_1 \times S)/T) \times \theta.$$

Figure 17B:
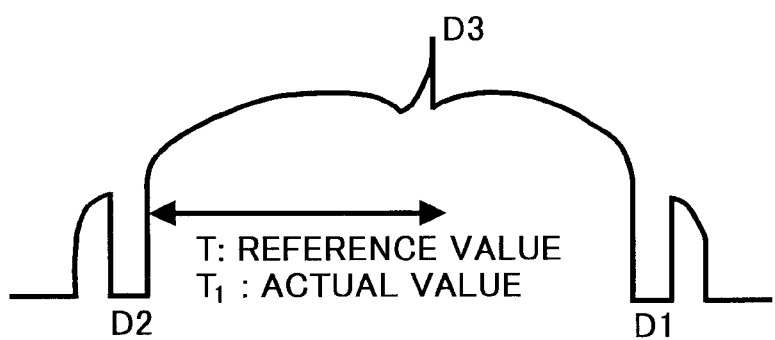

The reference value T is a reference count of pixels existing between the two black mask values M, corresponding to the black masks D2 and D3, included in the image signal from the CCD of the light receiving unit 6. The reference value $\theta$ is a reference angle for mounting the optical unit 3L, as shown in FIG. 17A. The relationship between the counts T and the reference value T1 and the waveform of the image signal is shown in FIG. 17B.

In a similar manner, the power-on setting unit 41 calculates a count $T_1\&_{quot;}$ of the pixels laying between the two black mask values M, corresponding to the black masks D4 and D1, included in the one-line image signal from the CCD of the light receiving unit 6 of the optical unit 3R. After that, the power-on setting unit 41 calculates an actual mounting angle $\theta_1\&_{quot;}$ for mounting the optical unit 3R based on a reference value $T\&_{quot;}$ prestored in the ROM 24, the above-mentioned reduction ration $S_1$, and a reference angle $\theta\&_{quot;}$ prestored in the ROM 24. In this case, the power-on setting unit 41 uses an equation, $$\theta_1\&_{quot;} = ((T_1\&_{quot;} \times S_1)/T\&_{quot;}) \times \theta\&_{quot;}.$$

The reference value $T\&_{quot;}$ is a reference count of pixels existing between the two black mask values M, corresponding to the black masks D4 and D1, included in the image signal from the CCD of the light receiving unit 6. The reference value $\theta\&_{quot;}$ is a reference angle for mounting the optical unit 3R.

Figure 18:
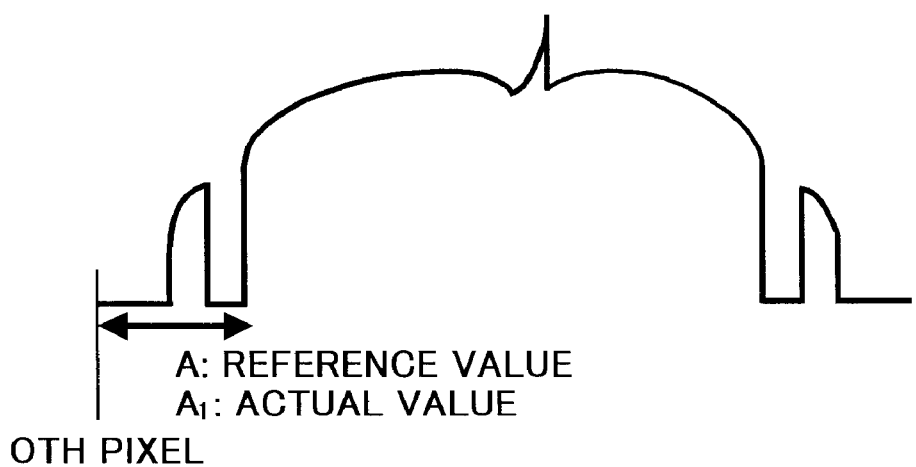
FIG. 18 is an illustration for explaining the number of the pixels laying between the first pixel and the black mask value M corresponding to the black mask D2.

Further, as shown in FIG. 18, the power-on setting unit 41 calculates a count $B_1$ of the pixels laying between the first pixel and the black mask value M, corresponding to the black mask D2, included in the one-line image signal from the CCD of the light receiving unit 6 of the optical unit 3L. After that, the power-on setting unit 41 calculates a left-right displacement K to be caused on the optical unit 3L based on a reference value B prestored in the ROM 24, the above-mentioned reduction ration S, and the calculated count $B_1$. In this case, the power-on setting unit 41 uses an equation, $$\text{i } K = (B_1 \times S) - B.$$

The reference value B is a reference count of pixels existing between the first pixel and the black mask values M, corresponding to the black mask D2, included in the image signal from the CCD of the light receiving unit 6 of the optical unit 3L.

In a similar manner, the power-on setting unit 41 calculates a count $B_1\&_{quot;}$ of the pixels laying between the first pixel and the black mask value M, corresponding to the black mask D2, included in the one-line image signal from the CCD of the light receiving unit 6 of the optical unit 3R.

After that, the power-on setting unit 41 calculates a left-right displacement $K_1$ to be caused on the optical unit 3R based on a reference value $B\&_{quot_i}$ prestored in the ROM 24, the above-mentioned reduction ration $S_1$, and the calculated count $B_1\&_{quot_i}$. In this case, the power-on setting unit 41 uses an equation, $$K_1 = (B_1\&_{quot_i} \times S_1) - B\&_{quot_i}.$$

The reference value $B\&_{quot_i}$ is a reference count of pixels existing between the first pixel and the black mask values M, corresponding to the black mask D2, included in the image signal from the CCD of the light receiving unit 6 of the optical unit 3R.

Figure 19:
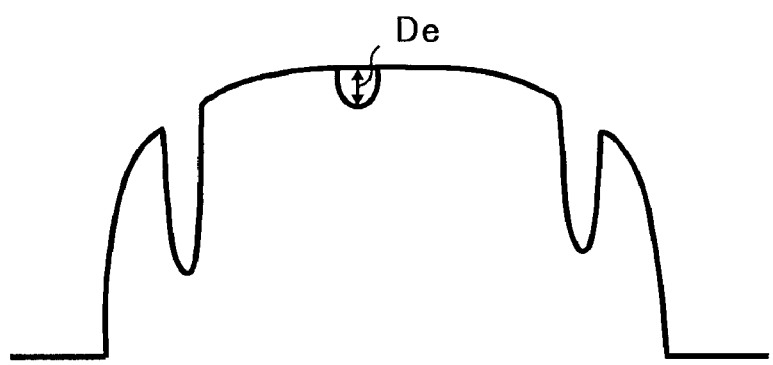
FIG. 19 is an illustration for explaining a difference De between white waveform data and a reference value.

In FIG. 15B, after the above-mentioned displacement correction coefficient calculation of Step S118, the process proceeds to Step S119. In Step S119, the power-on setting unit 41 reads white waveform data of the one-line image signal from the CCD of the light receiving units 6 of the optical units 3L and 3R via the A/D converter 20 and the image processing LSI 21. Then, in Step S120, the power-on setting unit 41 checks if the white waveform data is appropriate. More specifically, the power-on setting unit 41 checks if an obstacle such as a finger or the like is placed on the touch-panel 29, or, if the recursive reflecting members 4 are disturbed by a dust or the like. That is, the power-on setting unit 41 compares the one-line image signal (i.e., the white waveform data) from the CCD of the light receiving units 6 of the optical units 3L and 3R to a reference value prestored in the ROM 24 on a pixel-by-pixel basis. Based on this comparison, the power-on setting unit 41 checks if a difference De (see FIG. 19) between the white waveform data and the reference value is small than a predetermined value.

If the difference De between the white waveform data and the reference value is not smaller than a predetermined value, the power-on setting unit 41 judges as that an obstacle such as a finger or the like is placed on the touch-panel 29 or the recursive reflecting members 4 are disturbed by a dust or the like. In this case, in Step S121, the power-on setting unit 41 determines that the white waveform data is not in an appropriate condition. Then, the process returns to Step S120. If the difference De between the white waveform data and the reference value is smaller than a predetermined value, the power-on setting unit 41 determines that the white waveform data is in an appropriate condition, in Step S120, and the process proceeds to Step S122. In Step S122, the power-on setting unit 41 reads the image signal from the CCD of the light receiving units 6 of the optical units 3L and 3R via the A/D converter 20 and the image processing LSI 21 without causing the image processing LSI 21 to perform a shading correction. In this case, the power-on setting unit 41 reads the image signal as a shading correction waveform so as to allow the image processing LSI 21 to later perform the shading correction on the image signal from the CCD of the light receiving units 6 of the optical units 3L and 3R using the read shading correction waveform.

Then, in Step S123, the power-on setting unit 41 stops driving the LD of the light source 5. In Step S124, the power-on setting unit 41 sends a ready signal to the driver 17 via the interface unit 18. After that, in Step S125, the power-on setting unit 41 waits to receive an acknowledgement (ACK) signal from the driver 17. Upon receiving the ACK signal from the driver 17, the power-on setting unit 41 waits a scan start signal from the driver 17. Then, upon receiving the scan start signal from the driver 17, the power-on setting unit 41 ends the initialization operation.

Figure 20:
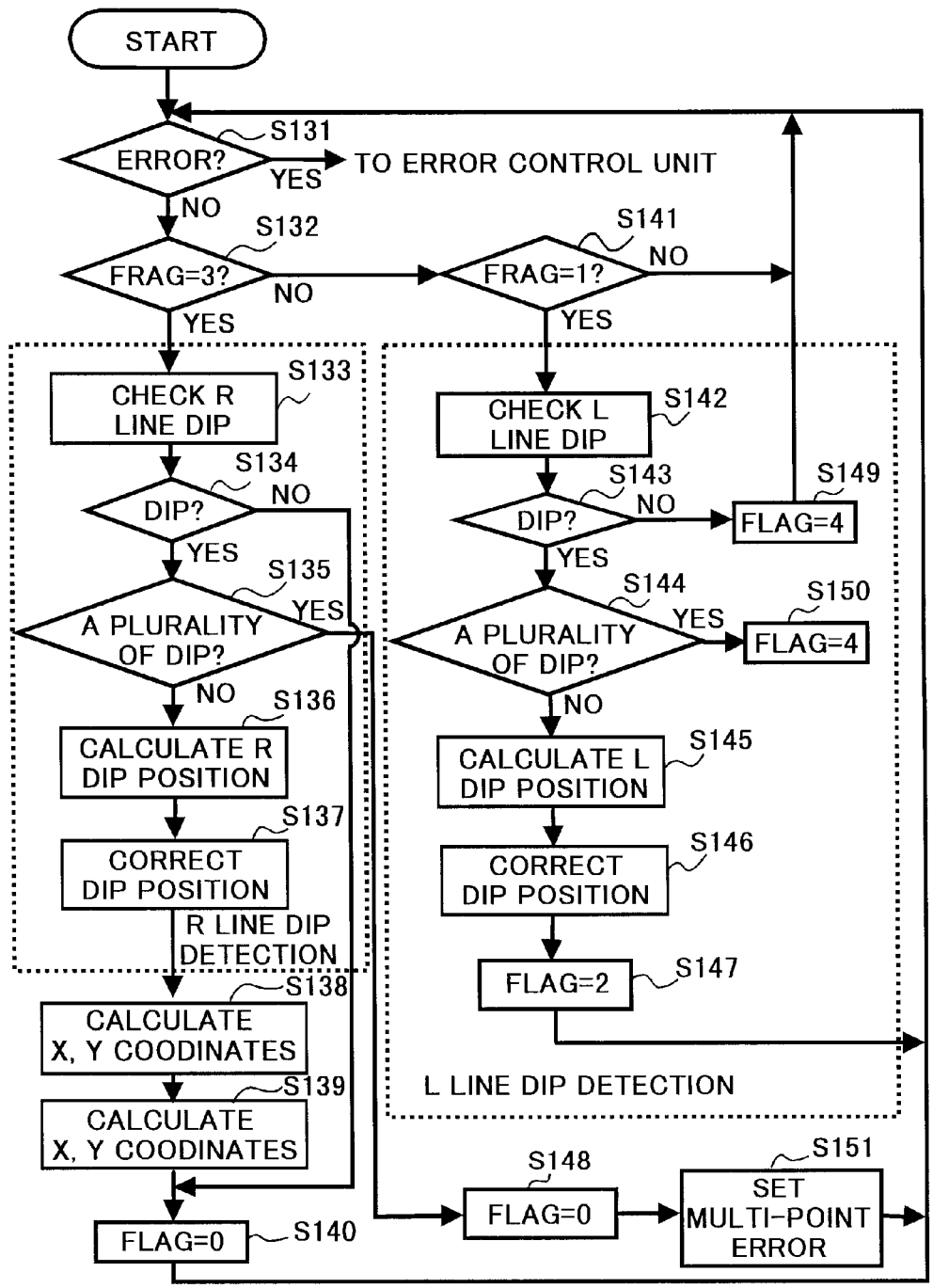
FIG. 20 is a flowchart of an error control operation performed by an error control unit included in the coordinate input apparatus of FIG. 1.

Referring to FIG. 20, an exemplary control flow of the dip detecting unit 42 is explained. The dip detecting unit 42 changes its internal transition states using a state control flag. The state control flag represents various states. When the state is 0, the dip detecting unit 42 is waiting for a dip of the optical unit 3L. When the state is 1, the dip detecting unit 42 has detected a dip of the optical unit 3L. When the state is 2, the dip detecting unit 42 waits for a dip of the optical unit 3R. When the state is 3, the dip detecting unit 42 has detected a dip of the optical unit 3R. When the state is 4, the dip detecting unit 42 cannot detect a dip of the optical units 3L and 3R.

Figure 21:
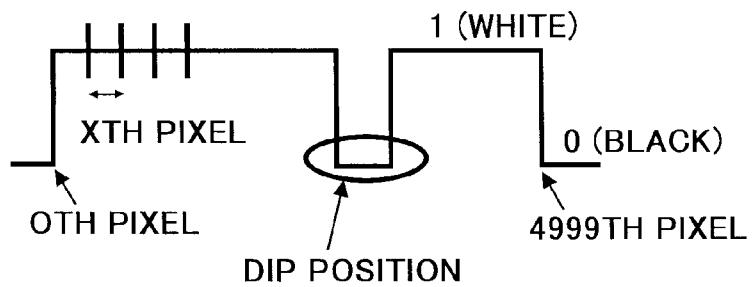
FIG. 21 is an illustration for explaining a dip detection operation performed by a dip detecting unit.

Upon starting the control flow of FIG. 20, the dip detecting unit 42 checks in Step S131 if there is any error caused. If there is an error, the dip detecting unit 42 passes the control to the error control unit 43. But, if there is no error caused, the dip detecting unit 42 checks if the state flag is set to 1 or 3, in Steps S132 and S141. If the state flag is set to 1, the dip detecting unit 42 proceeds to an L-line dip detection and checks a dip in the L line in Step S142. In Step S143, the dip detecting unit 42 determines if there is a dip in the L line. In this case, the dip detecting unit 42 compares the image signal stored in the line memory 22 to a threshold value on a block-of-pixel basis, as shown in FIG. 21, so as to judge if the block is white or black, wherein a block includes at least a minimum detectable number of pixels. By this judgement, the dip detecting unit 42 determines in Step S143 if there is a dip in the L line.

If the dip detecting unit 42 determines that there is no dip in the L line in Step S143, the dip detecting unit 42 sets the state control flag to 4 in Step S149. Then, the process returns to Step S131 and, in this case, the dip detecting unit 42 is caused not to perform the next L-line dip detection. If the dip detecting unit 42 determined that there is a dip in the L line in Step S143, it checks if there is a plurality of dips in the L line, in Step S144. If there is a plurality of dips in the L line and the check result of Step S144 is YES, the dip detecting unit 42 sets the state control flag to 4 in Step S150. Then, in Step S151, the dip detecting unit 42 sets a multi-point error and returns to Step S131.

If there is one dip in the L line and the check result of Step S144 is NO, the dip detecting unit 42 calculates a position of the dip in the L line in Step S145. In this case, the dip detecting unit 42 performs the operation of FIG. 9, in which the coordinate of the obstacle 27 blocking the laser ray in the input region 2 is calculated, and corrects in Step S146 the position of the dip (i.e., an obstacle blocking the laser ray) with the displacement correction coefficients obtained by the power-on setting unit 41 using the following equation.

$$E_1 = (E \times \theta_1) + K,$$

wherein E represents the position of the dip in the L line, $E_1$ represents the corrected position of the dip, $\theta 1$ represents the angle displacement correction coefficient for the angle of the optical unit 3L, and K represents the left-right displacement correction coefficient. After the correction of the dip position in Step S146, the dip detecting unit 42 sets the state control flag to 2 and returns to Step S131.

If the state flag is set to 3 and the check result of Step S132 is YES, the dip detecting unit 42 proceeds to an R-line dip detection and checks a dip in the R line in Step S133. In Step S134, the dip detecting unit 42 determines if there is a dip in the R line. In this case, the dip detecting unit 42 compares the image signal stored in the line memory 22 to a threshold value on a block-of-pixel basis so as to judge if the block is white or black, wherein a block includes at least a minimum detectable number of pixels. By this judgement, the dip detecting unit 42 determines in Step S134 if there is a dip in the R line.

If the dip detecting unit 42 determines that there is no dip in the R line in Step S134, the process proceeds to Step S140 in which the dip detecting unit 42 sets the state control flag to 0. Then, the process returns to Step S131. If the dip detecting unit 42 determined that there is a dip in the R line in Step S134, it checks if there is a plurality of dips in the R line, in Step S135. If there is a plurality of dips in the R line and the check result of Step S135 is YES, the process proceeds to Step S148 to set the state control flag to 0. Then, in Step S151, the dip detecting unit 42 sets a multi-point error and returns to Step S131.

If there is one dip in the R line and the check result of Step S135 is NO, the dip detecting unit 42 calculates a position of the dip in the R line in Step S136. In this case, the dip detecting unit 42 performs the operation of FIG. 9, in which the coordinate of the obstacle 27 blocking the laser ray in the input region 2 is calculated, and corrects in Step S137 the position of the dip (i.e., an obstacle blocking the laser ray) with the displacement correction coefficients obtained by the power-on setting unit 41 using the following equation.

$$E_1 \&_{quoi} = (E \&_{quoi} \times \theta_1 \&_{quoi}) + K_1,$$

wherein $E\&_{quoi}$ represents the position of the dip in the R line, $E_1\&_{quoi}$ represents the corrected position of the dip in the R line, $\theta_1\&_{quoi}$ represents the angle displacement correction coefficient for the angle of the optical unit 3R, and $K_1$, represents the left-right displacement correction coefficient. After the correction of the dip position in the R line in Step S137, the dip detecting unit 42 proceeds to Step S138.

Figure 22:
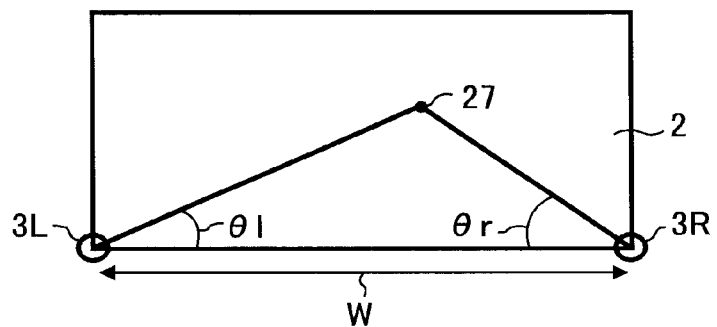
FIG. 22 is an illustration for explaining a calculation of x and y coordinate values in the coordinate input apparatus of FIG. 1.

In Step S138, the dip detecting unit 42 calculates x, y coordinates of the obstacle 27 in the input region 2 based on the pixel positions on the CCD of the light receiving units 6 of the optical units 3L and 3R and the angles of the optical units 3L and 3R. In this calculation, the dip detecting unit 42 uses the following equation based on the measuring method of triangulation, as shown in FIG. 22;

$$X=(\tan \theta r \times W)/(\tan \theta l + \tan \theta r), \text{ and}$$

$$Y=X \times \tan \theta l,$$

wherein X, Y respectively represent x, y coordinate values of the obstacle 27 in the input region 2, θl and θr represent the angles of optical units 3L and 3R, respectively, and W represents a distance between the optical units 3L and 3R.

Then, in Step S139, the dip detecting unit 42 sends the calculated X and Y representing the x and y coordinates of the obstacle 27 to the driver 17 via the interface unit 18, and sets the state control flag to 0, in Step S140. After that, the process returns to Step S131.

The interface control unit 44 controls the interface unit 18 and sets the above-described first and second light amount references in accordance with a command from the driver 17.

The error control unit 43 handles various kinds of errors. In the example being explained, there are two basic errors; unrecoverable error that requires an engineer's repair and recoverable error that can be recovered by the user. The interlock-open, the white waveform error, and the multi-point error are examples of the unrecoverable error. The LD error and the reading area error are examples of the recoverable error.

Figure 23:
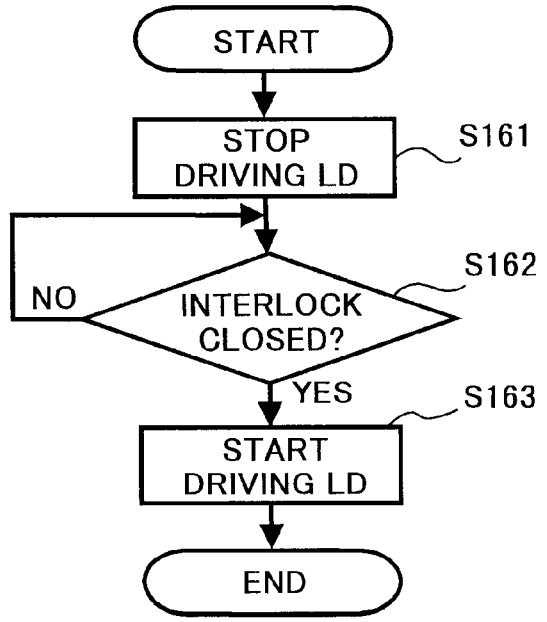
FIG. 23 is a block diagram for explaining an interlock open-error recovery performed by an error control unit.

For example, when the interlock mechanism is open, the LD does not emit the laser ray and no dip can be detected. Accordingly, this becomes an error. FIG. 23 shows an exemplary procedure of an interlock error recovery operation performed by the error control unit 42. At an occurrence of the interlock error, the error control unit 43 stops driving the LD of the light source 5 (Step S161), repeatedly checks if the interlock mechanism is closed until the interlock mechanism is closed (Step S162), and starts driving the LD of the light source 5 when the interlock mechanism is closed (Step S163). Then, the procedure ends. After ending the procedure, the error control unit 43 may return to the control condition presented before the interlock error occurs.

Figure 24:
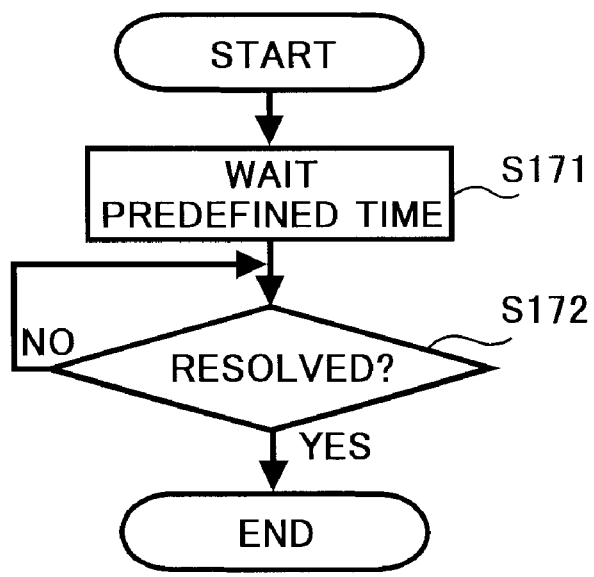
FIG. 24 is a block diagram for explaining a white waveform error recovery performed by an error control unit.

The dip detection cannot be performed in a proper manner when an obstacle such as a finger or the like is placed on the touch-panel 29, or, when the optical units 3L and 3R and the recursive reflecting members 4 are disturbed by a dust or the like, during the reading of the shading correction data in the dip detecting operation. In such a case, the error control unit 43 handles the case as the white waveform error. FIG. 24 shows an exemplary procedure of the white waveform error recovery operation performed by the error control unit 43. In this procedure, the error control unit 43 waits until a predetermined time period passes (Step S171), and repeatedly checks if the white waveform error is resolved until it is resolved (Step S172). When the white waveform error is resolved, the procedure ends. After ending the procedure, the error control unit 43 may return the process to the power-on setting.

At an occurrence of the multi-point error, the error control unit 43 sends the information of the multi-point error to the driver 17 via the interface unit 18, continuing the performance of the dip detection operation.

Figure 25:
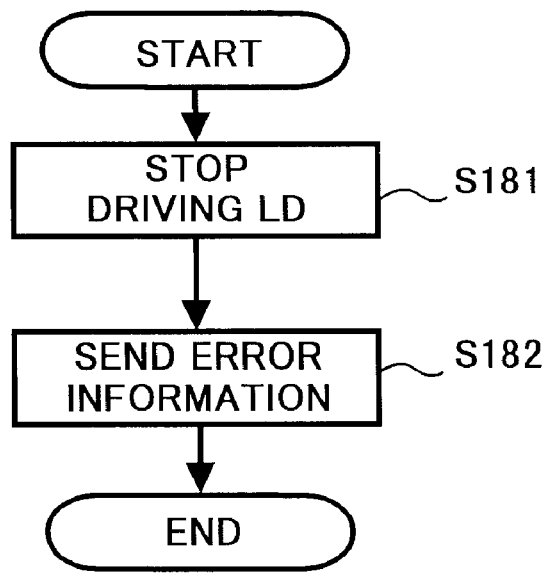
FIG. 25 is a block diagram for explaining an LD error recovery performed by an error control unit.

The LD error will occur at an occasion, for example, when the LD fails to emit the laser ray, or, when the light receiving unit 6 does not receive the laser ray because by any reason the laser ray from the LD is not caused to impinge on the recursive reflecting members 4. FIG. 25 shows an exemplary procedure of the LD error recovery operation performed by the error control unit 43. In the procedure, the error control unit 43 stops driving the LD of the optical units 3L and 3R (Step S181), and sends the information of the LD error to the driver 17 via the interface unit 18 (Step S182). Then, the procedure ends. After ending the procedure, the error control unit 43 may pass the control to the power-on setting unit 41 to wait the initialization signal from the driver 17.

Figure 26:
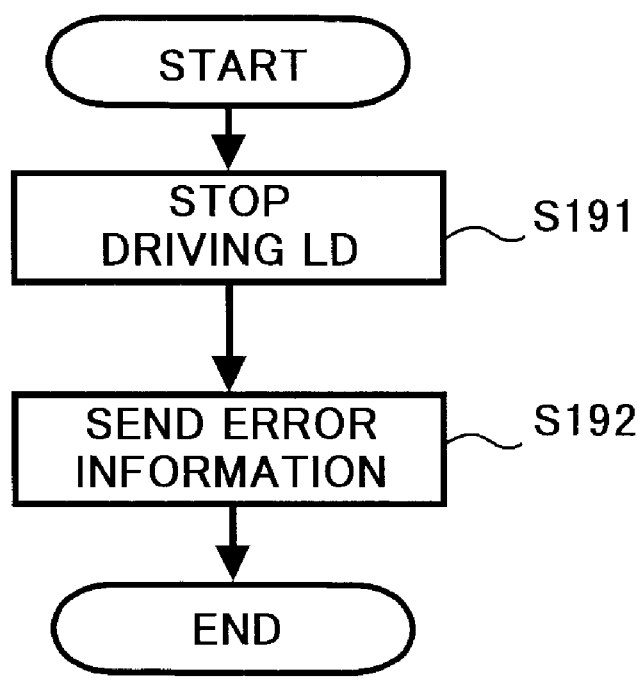
FIG. 26 is a block diagram for explaining a reading area error recovery performed by an error control unit.

The reading area error will occur at an occasion, for example, when the black mask data is not detected through the block-based checks of all pixels of the one-line image signal from the CCD of the light receiving unit. FIG. 26 shows an exemplary procedure of the reading area error recovery operation performed by the error control unit 43. In the procedure, the error control unit 43 stops driving the LD of the optical units 3L and 3R (Step S191), and sends the information of the reading area error to the driver 17 via the interface unit 18 (Step S192). Then, the procedure ends. After ending the procedure, the error control unit 43 may pass the control to the power-on setting unit 41 to wait the initialization signal from the driver 17.

By having the dip detecting unit 42 capable of correcting for the position and angle displacements of the light receiving unit relative to the signal from the light receiving unit, the coordinate input apparatus 1 installed on the electronic copyboard system 150 can detect the coordinate of the obstacle in a more accurate manner.

Figure 27:
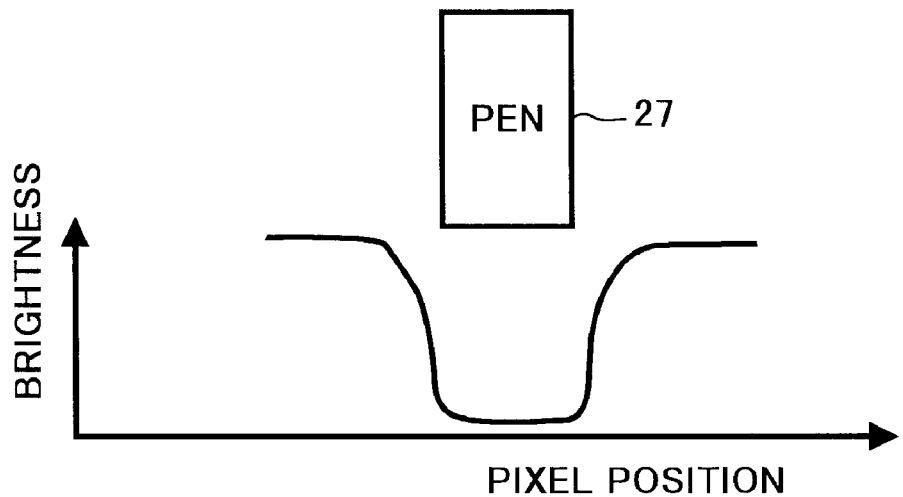
FIG. 27 is an illustration for explaining a relationship between a position of a pixel in a light receiving device and brightness of the pixel relative to an obstacle.
Figure 28:
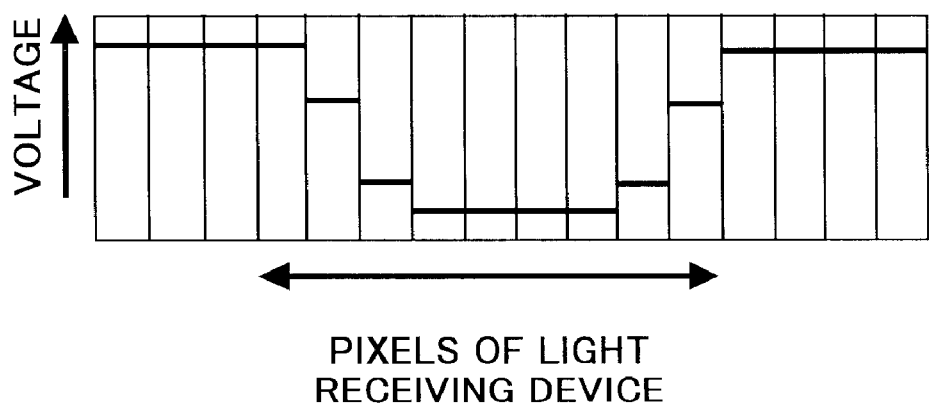
FIG. 28 is an illustration for explaining a relationship between a pixel and a voltage of the pixel relative to an obstacle.

Next, another coordinate calculation operation of the drawing system 100 is explained with reference to FIGS. 27–31. In the drawing system 100, the relationship between the pixel positions in the light receiving device (i.e., the CCD) 15 and the brightness relative to the obstacle 27 (i.e., a pen) is as shown in FIG. 27, wherein the obstacle 27 is placed in the input region 2 and a plurality of pixels corresponding to the position of the obstacle 27 are therefore darkened. Each of the pixels corresponds to each of the plurality of the photoelectric conversion cells included in the photoelectric conversion array of each light receiving device 15. The relationship between a pixel and a voltage is as shown in FIG. 28, wherein a voltage represents an image signal photoelectric-converted from the laser ray by the photoelectric device and is output from the light receiving device 15.

The line image signal output from each of the light receiving devices 15 of the optical units 3L and 3R represents a signal voltage corresponding to the brightness of each pixel of the light receiving devices 15. This line image signal is A/D-converted by the A/D converter 20 and is then subjected to the image processing operation performed by the image processing LSI 21. After that, the data of the line image signal is stored in the line memory 22. The CPU 23 reads the line image signal stored in the line memory 22 and determines a coordinate position at which the laser ray is blocked by the obstacle 27 in the input region 2.

In this case, the position of each photoelectric conversion cell (i.e., each pixel position) of the light receiving device 15 corresponds to the coordinate on the input region 2 and to the address of the line memory 22 at which the data of the pixel signal is stored. Therefore, a basic resolution of the coordinates obtained by the calculation with the CPU 23 is determined by a number of the photoelectric conversion cells (i.e., a number of the pixels) included in the light receiving device 15. The obstacle 27 is large enough relative to such a basic resolution and is capable of blocking the laser rays of a plurality of pixels.

More specifically, the CPU 23 is provided with a light amount reference for comparing with each pixel of the image signal stored in the line memory 22 so as to determine a coordinate at which the laser ray is blocked by the obstacle 27 in the input region 2 for each of the optical units 3L and 3R. When the CPU 23 detects a first pixel that is smaller than the above-mentioned light amount reference, the CPU 23 determined as that the first pixel is within an area blocked by the obstacle 27.

Since the coordinates and the pixel positions correspond to each other, the coordinate value of the focus pixel can be obtained by reading an address of the focus pixel in the one-line image signal. More specifically, the CPU 23 determines a formula that represents an approximate line passing through the first pixel handled as a base pixel, the previous pixel, and the following pixel, based on the brightness of these three pixels and using a method of least squares. Then, the CPU 23 calculates a point of intersection of the obtained approximate line and the light amount reference and determines the resultant point of intersection as the coordinate of the edge of the obstacle.

Figures 29, 30:
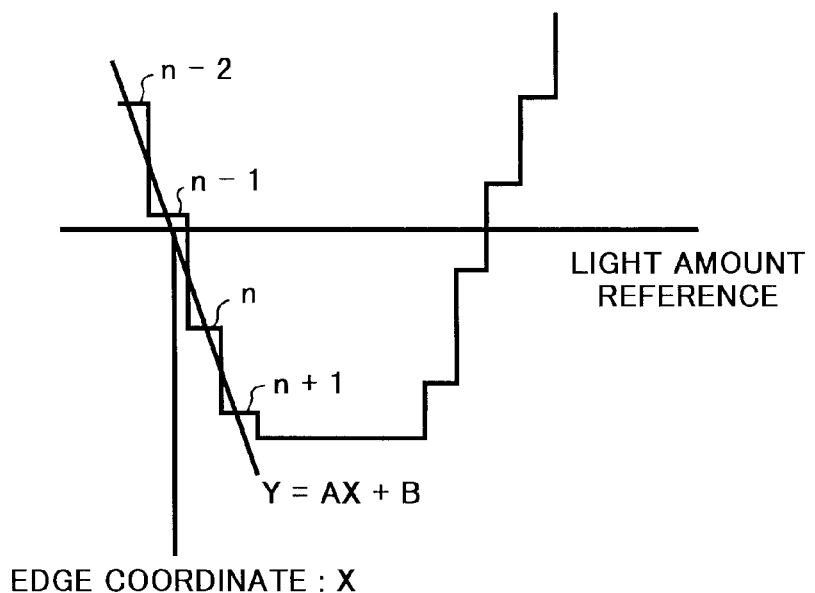
FIG. 29 is an illustration for explaining an output signal waveform output from a CCD.
FIG. 30 is a table representing data of each pixels for computing an envelope using a method of least squares.

In the following calculation, $Y_s$ represents a value of the light amount reference, $Y_n$ represents a light amount value of an nth pixel to be a base pixel, $Y_{(n-1)}$ represents a light amount value of a (n−1)th pixel, $Y_{(n+1)}$ represents a light amount value of a (n+1)th pixel, $X_n$ represents a coordinate of the nth pixel as the base pixel, $X_{(n-1)}$ represents a coordinate of a (n−1)th pixel, $X_{(n+1)}$ represents a coordinate of a (n+1)th pixel, and K represents a coordinate difference between two adjacent pixels. As shown in FIG. 29, the CPU 23 determines that the coordinate $X_1$ of the point of intersection between the approximate line y=ax+b passing through the points of $X_{(n-1)}$, $X_n$, and $X_{(n+1)}$ and the light amount reference $Y_s$ is the coordinate $X+X_n$ of an edge of the obstacle.

The CPU 23 calculated a computed envelope using the method of least squares and, based on the normal equation, obtains;

$$a = [i\Sigma XY - \Sigma X\Sigma Y]/[i\,\Sigma X^2 - (_{93}X)^2], \text{ and} \quad (1)$$

$$b = (\Sigma Y - a\Sigma X)/i. \quad (2)$$

The CPU 23 determines $X_n = 0$, $X_{n-X(n-1)} = X_n + X_{(n+1)} = K$ and computes an envelope with three pixels; the focus pixel, the previous pixel, and the following pixel. FIG. 30 shows data of each pixel. Based on the data of FIG. 30, the above-mentioned equations (1) and (2) are;

$$a = [3 * K\{Y_{(n+1)} - Y_{(n-1)}\} - 0]/[3 * 2X^2 - 0] \quad (3)$$
$$= \{Y_{(n+1)} - Y_{(n-1)}\}/2K, \text{ and}$$

$$b = \{Y_{(n+1)} + Y_n + Y_{(n-1)} - 0\}/3 \quad (4)$$
$$= \{Y_{(n+1)} + Y_n + Y_{(n-1)}\}/3.$$

Therefore, the coordinate $X_1$ of the intersection of the point between this line and the light amount reference $Y_s$ is;

$$X_1 = (Y_s - b)/a$$
$$= 2K[Y_s - \{Y_{(n+1)} + Y_n + Y_{(n-1)}\}/3]/\{Y_{(n+1)} - Y_{(n-1)}\}.$$

Accordingly, the coordinate X of the obstacle is;

$$X = X_n + 2K[Y_s - \{Y_{(n+1)} + Y_n + Y_{(n-1)}\}/3]/\{Y_{(n+1)} - Y_{(n-1)}\}.$$

Figure 31:
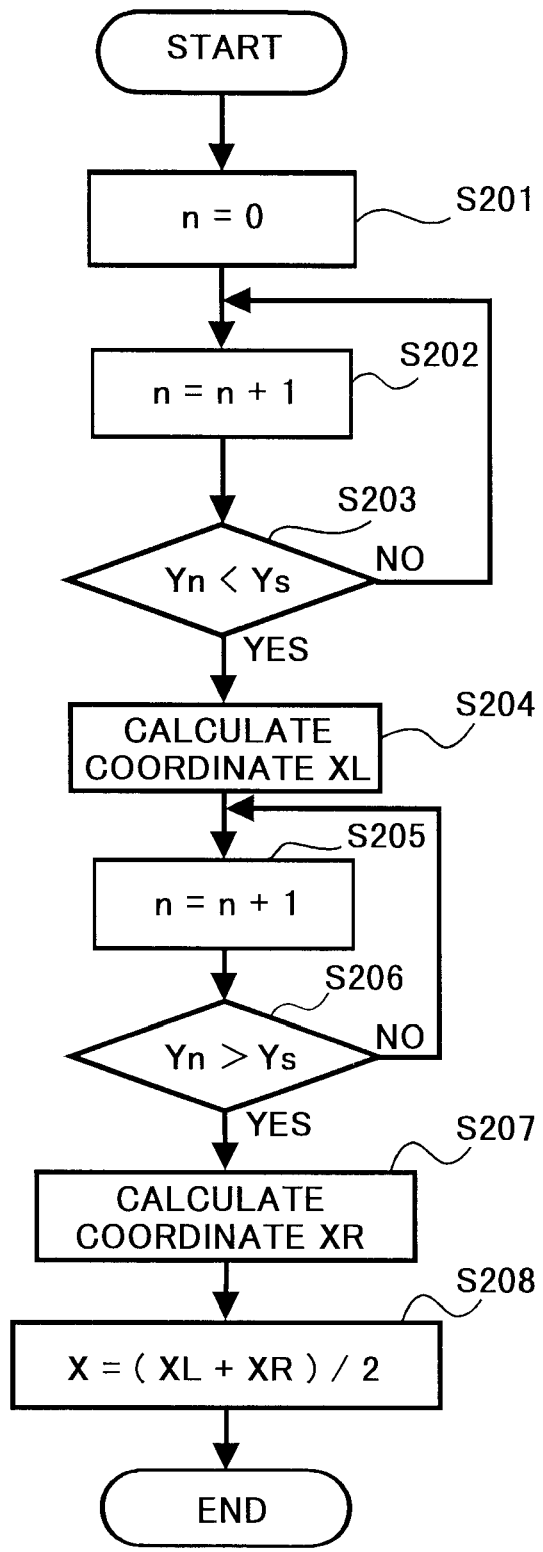
FIG. 31 is a flowchart of another coordinate calculation performed by the coordinate input apparatus of FIG. 1.

FIG. 31 shows a procedure of the above-described coordinate calculation performed by the CPU 23. In Step S201, the CPU 23 sets a pixel number n to 0 in Step S201 and subsequently increments the pixel number n by 1 in Step S202. Then, in Step S203, the CPU 23 compares a pixel signal $Y_n$ of the nth pixel stored in the line memory 22 with the light amount reference $Y_s$ to judge whether the pixel signal $Y_n$ is smaller than the light amount reference $Y_s$, wherein the pixel signal $Y_n$ represents a voltage corresponding to the light amount of the nth pixel. If the pixel signal $Y_n$ is not smaller than the light amount reference $Y_s$ and the judgement result is NO, the process returns to Step S202 to repeat the processes of the increment of n and the judgement of $Y_n < Y_s$ until the judgement of $Y_n < Y_s$ becomes true.

If $Y_n < Y_s$ becomes true and the judgement result of Step S203 is YES, the process proceeds to Step S204 and the CPU 23 performs the coordinate calculation based on the various values included in the image signal stored in the line memory 22; the value $Y_n$ of the base pixel, the value $Y_{(n-1)}$ of the previous (left) pixel relative to the base pixel, the value $Y_{(n-1)}$ of the following (right) pixel relative to the base pixel, the coordinate $Y_n$ of the base pixel, the coordinate $X_{(n-1)}$ of the previous (left) pixel relative to the base pixel, the value $Y_{(n+1)}$ of the following (right) pixel relative to the base pixel, the difference K between two adjacent pixels, and the value $Y_s$ of the light amount reference. As a result of this coordinate calculation, the CPU 23 outputs a coordinate XL, representing the left edge of the obstacle 27, in an equation;

$$XL = X_n + 2K[Y_s - \{Y_{(n+1)} + Y_n + Y_{(n-1)}\}/3]/\{Y_{(n+1)} - Y_{(n-1)}\}.$$

After that, the CPU 23 calculates the coordinate XR in a manner similar to the above calculation for the coordinate XL. In Step S205, the CPU 23 increments the pixel number n by 1. Then, in Step S206, the CPU 23 compares a pixel signal $Y_n$ of the nth pixel stored in the line memory 22 with the light amount reference $Y_s$ to judge whether the pixel signal $Y_n$ is greater than the light amount reference $Y_s$. If the pixel signal $Y_n$ is not greater than the light amount reference $Y_s$ and the judgement result is NO, the process returns to Step S205 to repeat the processes of the increment of n and the judgement of $Y_n > Y_s$ until the judgement of $Y_n > Y_s$ becomes true.

If $Y_n > Y_s$ becomes true and the judgement result of Step S206 is YES, the process proceeds to Step S207 and the CPU 23 performs the coordinate calculation based on the various values included in the image signal stored in the line memory 22; the value $Y_n$ of the base pixel, the value $Y_{(n-1)}$ of the previous (left) pixel relative to the base pixel, the value $Y_{(n+1)}$ of the following (right) pixel relative to the base pixel, the coordinate $Y_n$ of the base pixel, the coordinate $X_{(n-1)}$ of the previous (left) pixel relative to the base pixel, the value $Y_{(n+1)}$ of the following (right) pixel relative to the base pixel, the difference K between two adjacent pixels, and the value $Y_s$ of the light amount reference. As a result of this coordinate calculation, the CPU 23 outputs a coordinate XR, representing the right edge of the obstacle 27, in an equation;

$$XR = X_n + 2K[Y_s - \{Y_{(n+1)} + Y_n + Y_{(n-1)}\}/3]/\{Y_{(n+1)}Y_{(n-1)}\}.$$

Then, in Step S208, the CPU 23 obtains the coordinate X of the obstacle 27 blocking the laser ray in the input region 2 by calculating a mean value of the coordinates XL and XR using an equation X=(XL+XR)/2. Then, the CPU 23 ends the coordinate calculation procedure.

As an alternative to the approximate line passing through three points, an approximate line passing through four points additionally having a count (n−2) of the pixel may be used. In this case, the approximate line passing through the above-mentioned four points is calculated as follows;

$$a = \{3Y_{(n+1)} - Y_n - Y_{(n-1)}\} - 3Y_{(n-2)}\}/10K \quad (5)$$

$$b = \{Y_{(n-2)} + 2Y_{(n-1)} + 3Y_n + 4Y_{(n+1)}\}/10 \quad (4)$$
$$= \{Y_{(n+1)} + Y_n + Y_{(n-1)}\}/3$$

Therefore, the coordinate $X_1$ of the intersection of the point between this line and the light amount reference $Y_s$ is;

$$X_1 = (Y_s - b)/a$$
$$= 10K[Y_s - \{Y_{(n-2)} + 2Y_{(n-1)} + 3Y_n + 4Y_{(n+1)}\}/10]/$$
$$\{3Y_{(n+1)}Y_n - Y_{(n-1)} - 3Y_{(n-2)}\}.$$

Accordingly, the coordinate XL of the left edge of the obstacle is;

$$XL = X_n + 10K[Y_s - \{Y_{(n-2)} + 2Y_{(n-1)} + 3Y_n + 4Y_{(n+1)}\}/10]/\{3Y_{(n+1)} + Y_nY_{(n-1)} - 3Y_{(n-2)}\}.$$

Also, the coordinate XR of the right edge of the obstacle is;

$$XR = X_n + 10K[Y_s - \{Y_{(n+2)} + 2Y_{(n+1)} + 3Y_n + 4Y_{(n-1)}\}/10]/\{3Y_{(n-1)} + Y_n - Y_{(n+1)} - 3Y_{(n+2)}\}.$$

In this case, it must be noted that the calculations for XL and XR are different from each other.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations of the present application are possible in light of the above teachings. It is therefore to be understood that within the scope of the appended claims, the present application may be practiced otherwise than as specifically described herein.

What is claimed as new and is desired to be secured by Letters Patent of the United States is:

1. A coordinate input apparatus, comprising:
    a plurality of light sources, each light source being fixed around a perimeter of a predefined input region at a fixing position different from others of the light sources and configured to emit light approximately in parallel to said predefined input region;
    a reflecting member fixed around said perimeter of said predefined input region and configured to recursively reflect said light so that said light returns towards said plurality of light sources;
    a plurality of light receiving members fixed around said perimeter of said predefined input region and configured to receive said light recursively reflected from said reflecting member and to convert said light into electric signals;
    a signal analyzing mechanism configured to analyze said electric signals to detect a position of an obstacle when said obstacle is placed in said input region and blocks said light output from said plurality of light sources; and
    a coordinate determining mechanism configured to calculate a center between coordinates of edges of said obstacle and to determine said center as a coordinate of said position of said obstacle in said input region based on a plurality of successively-aligned pixels in said electric signals, including at least a focus pixel and pixels immediately previous to and subsequent to said focus pixel.

2. A coordinate input apparatus as defined in claim 1, wherein the emitted light from said plurality of light sources extends in a deltaic form centered at said fixing position.

3. A coordinate input apparatus, comprising:
    a plurality of light sources, each light source being fixed around a perimeter of a predefined input region at a fixing position different from others of the light sources and configured to emit light and approximately in parallel to said predefined input region;
    a reflecting member fixed around said perimeter of said predefined input region and configured to recursively reflect said light so that said light returns towards said plurality of light sources;
    a plurality of light receiving members fixed around said perimeter of said predefined input region and configured to receive said light recursively reflected from said reflecting member and to convert said light into electric signals;
    a signal analyzing mechanism configured to analyze said electric signals to detect a position of an obstacle when said obstacle is placed in said input region and blocks said light output from said plurality of light sources;
    a memory configured to prestore a first light amount reference value and a second light amount reference value having a value greater than that of said first light amount reference value; and
    a coordinate determining mechanism configured to determine a coordinate of said position of said obstacle placed in said input region based on a plurality of successively-aligned pixels in said electric signals, including at least a focus pixel and pixels immediately previous to and immediately subsequent to said focus pixel, and said first and second light amount reference values such that:

when each of said immediately previous, focus, and immediately subsequent pixels has a brighter value than that of said second light amount reference value, a coordinate of said focus pixel is determined as not a coordinate of an edge of said obstacle;

when each of said immediately previous and focus pixels has a brighter value than that of said second light amount reference value and said immediately subsequent pixel has a darker value than those of said first and second light amount reference values, the coordinate of said focus pixel is determined as not a coordinate of an edge of said obstacle;

when said immediately previous pixel has a brighter value than that of said second light amount reference value, when the focus pixel has a darker value than that of said second light amount reference value, and when said immediately subsequent pixel has a darker value than those of said first and second light amount reference values, the coordinate of said focus pixel is determined as a coordinate between a center and a right edge of said obstacle;

when said immediately previous pixel has a brighter value than that of said second light amount reference value, when said focus pixel has a darker value than that of said first light amount reference value, and when said immediately subsequent pixel has a darker value than those of said first and second light amount reference values, the coordinate of said focus pixel is determined as a coordinate of the center of said obstacle;

when said immediately previous pixel has a darker value than those of said first and second light amount reference values, and when each of said focus and immediately subsequent pixels has a brighter value than that of said second light amount reference value, the coordinate of said focus pixel is determined as not the coordinate of the center of said obstacle;

when said immediately previous pixel has a darker value than those of said first and second light amount reference values, when said focus pixel has a darker value than that of said second light amount reference value, and when said immediately subsequent pixel has a brighter value than that of said second light amount reference value, the coordinate of said focus pixel is determined as a coordinate between a left edge and the center of said obstacle;

when said immediately previous pixel has a darker value than those of said first and second light amount reference values, when said focus pixel has a darker value than that of aid first light amount reference value, and when said immediately subsequent pixel has a brighter value than that of said second light amount reference value, the coordinate of said focus pixel is determined as the coordinate of the center of said obstacle; and when each of said immediately previous, focus, and immediately subsequent pixels has a darker value than those of said first and second light amount reference values, the coordinate of said focus pixel is determined as not a coordinate of an edge of said obstacle.

4. A coordinate input apparatus as defined in claim 3, wherein the emitted light from said plurality of light sources extends in a deltaic form centered at said fixing position.

5. A coordinate input apparatus, comprising:
a plurality of light sources, each light source being fixed around a perimeter of a predefined input region at a fixing position different from others of the light sources and configured to emit light approximately in parallel to said predefined input region;
a reflecting member fixed around said perimeter of said predefined input region and configured to recursively reflect said light so that said light returns towards said plurality of light sources;
a plurality of light receiving members fixed around said perimeter of said predefined input region, configured to receive said light recursively reflected from said reflecting member and to convert said light into electric signals, and each of said plurality of light receiving members including a photoelectric conversion cell array including a plurality of photoelectric conversion cells placed in a line for receiving said light reflected from said reflecting member, an order of said plurality of said photoelectric conversion cells placed in the line corresponding to coordinates of said input region;
a signal analyzing mechanism configured to analyze said electric signals to detect a position of an obstacle when said obstacle is placed in said input region and blocks the light output from said plurality of light sources; and
a coordinate determining mechanism configured to determine a coordinate of said position of said obstacle placed in said input region based on a result of an analysis made by said signal analyzing mechanism and based on a plurality of successively-aligned pixels in said electric signals, including at least a focus pixel and pixels immediately previous to and subsequent to said focus pixel.

6. A coordinate input apparatus as defined in claim 5, wherein the emitted light from said plurality of light sources extends in a deltaic form centered at said fixing position.

7. A coordinate input apparatus as defined in claim 5, wherein each photoelectric conversion cell array includes a charge-coupled device.

8. A coordinate input apparatus as defined in claim 5, wherein each photoelectric conversion cell array includes a phototransistor array.

9. A coordinate input apparatus as defined in claim 5, wherein each photoelectric conversion cell array includes a photodiode array.

10. A coordinate input apparatus as defined in claim 5, further comprising a correcting mechanism configured to correct said electric signals respectively output from each of said light receiving members for an angle displacement of each of said plurality of light receiving members.

11. A coordinate input apparatus as defined in claim 5, further comprising a correcting mechanism configured to correct said electric signals respectively output from each of said light receiving members for a position displacement of each of said plurality of light receiving members.

12. A method for coordinate input, comprising the steps of:
providing a plurality of light sources, each light source being fixed around a perimeter of a predefined input region at a fixing position different from others of the light sources;
causing said plurality of light source to emit light approximately in parallel to said predefined input region;
reflecting said light recursively around said perimeter of said predefined input region;
receiving said light reflected by said reflecting step by a plurality of light receiving members fixed around said perimeter of said predefined input region;

converting said light received by said reflecting step into electric signals;

analyzing said electric signals to detect a position of an obstacle when said obstacles is placed in said input region and blocks the light output from said plurality of light sources;

calculating a center between coordinates of edges of said obstacle; and determining said center as a coordinate of said position of said obstacle in said input region base on a plurality of successively-aligned pixels in said electric signals, including at least a focus pixel and pixels immediately previous to and subsequent to said focus pixel.

13. A method for coordinate input as defined in claim 12, wherein the emitted light from said plurality of light sources extends in a deltaic form centered at said fixing position.

14. A method for coordinate input, comprising the steps of:

prestoring into a memory a first light amount reference value and a second light amount reference value having a value greater than that of said first light amount reference value;

providing a plurality of light sources, each light source being fixed around a perimeter of a predefined input region at a fixing position different from others of the light sources;

causing said plurality of light sources to emit light approximately in parallel to said predefined input region;

reflecting said light recursively around said perimeter of said predefined input region;

receiving said light reflected by said reflecting step by a plurality of light receiving members fixed around said perimeter of said predefined input region;

converting said light received by said reflecting step into electric signals;

analyzing said electric signals to detect a position of an obstacle when said obstacle is placed in said input region and blocks the light output from said plurality of light sources; and determining a coordinate of said position of said obstacle placed in said input region based on a plurality of successively-aligned pixels in said electric signal, including at least a focus pixel and pixels immediately previous to and immediately subsequent to said focus pixel, and said first and second light amount reference values such that:

when each of said immediately previous, focus, and immediately subsequent pixels has a brighter value than that of said second light amount reference value, a coordinate of said focus pixel is determined as not a coordinate of an edge of said obstacle;

when each of said immediately previous and focus pixels has a brighter value than that of said second light amount reference value and said immediately subsequent pixel has a darker value than those of said first and second light amount reference values, the coordinate of said focus pixel is determined as not a coordinate of an edge of said obstacle;

when said immediately previous pixel has a brighter value than that of said second light amount reference value, when the focus pixel has a darker value than that of said second light amount reference value, and when said immediately subsequent pixel has a darker value than those of said first and second light amount reference values, the coordinate of said focus pixel is determined as a coordinate between a center and a right edge of said obstacle;

when said immediately previous pixel has a brighter value than that of said second light amount reference value, when said focus pixel has a darker value than that of said first light amount reference value, and when said immediately subsequent pixel has a darker value than those of said first and second light amount reference values, the coordinate of said focus pixel is determined as a coordinate of the center of said obstacle;

when said immediately previous pixel has a darker value than those of said first and second light amount reference values and when each of said focus and immediately subsequent pixels has a brighter value than that of said second light amount reference value, the coordinate of said focus pixel is determined as not the coordinate of the center of said obstacle;

when said immediately previous pixel has a darker value than those of said first and second light amount reference values, when said focus pixel has a darker value than that of said second light amount reference value, and when said immediately subsequent pixel has a brighter value than that of said second light amount reference value, the coordinate of said focus pixel is determined as a coordinate between a left edge and the center of said obstacle;

when said immediately previous pixel has a darker value than those of said first and second light amount reference values, when said focus pixel has a darker value than that of said first light amount reference value, and when said immediately subsequent pixel has a brighter value than that of said second light amount reference value, the coordinate of said focus pixel is determined as the coordinate of the center of said obstacle; and when each of said immediately previous, focus, and immediately subsequent pixels has a darker value than those of said first and second light amount reference values, the coordinate of said focus pixel is determined as not a coordinate of an edge of said obstacle.

15. A method for coordinate input as defined in claim 14, wherein the emitted light from said plurality of light sources extends in a deltaic form centered at said fixing position.

16. A coordinate input apparatus, comprising:

a touch-panel;

a plurality of light sources, each light source being fixed around a perimeter of said touch-panel at a fixing position different from others of the light sources and configured to emit light approximately in parallel to said touch-panel;

a reflecting member fixed around said perimeter of said touch-panel and configured to recursively reflect said light so that said light returns towards said plurality of light sources;

a plurality of light receiving members fixed around said perimeter of said touch-panel and configured to receive said light recursively reflected from said reflecting member and to convert said light into electric signals, said plurality of light receiving members being integral with said plurality of light sources;

a signal analyzing mechanism configured to analyze said electric signals to detect a position of an obstacle when said obstacle is placed on said touch-panel and blocks the light output from said plurality of light sources;

a coordinate calculating mechanism configured to execute an approximate equation configured to subtract variations of said light amount from coordinates respectively close to coordinates of edges of said obstacle in order to obtain coordinates in accordance with a light amount reference value, and to output said coordinates obtained through said approximate equation as true coordinates of the edges of said obstacle; and a coordinate determining mechanism configured to calculate a center between said true coordinates of the edges of said obstacle and to determine said center calculated as a coordinate of said position of said obstacle placed in said touch-panel, wherein said coordinate calculating mechanism executes said approximate equation using a first pixel with a light amount value which exceeds that of said light amount reference value, and light amounts of pixels immediately previous to and immediately subsequent to said first exceeding pixel.

17. A coordinate input apparatus as defined in claim 16, wherein the emitted light from said plurality of light sources extends in a deltaic form centered at said fixing position.

18. A coordinate input apparatus, comprising:

a touch-panel;

a plurality of light sources, each light source being fixed around a perimeter of said touch-panel at a fixing position different from others of the light sources and configured to emit light approximately in parallel to said touch-panel;

a reflecting member fixed around said perimeter of said touch-panel and configured to recursively reflect said light so that said light returns towards said plurality of light sources;

a plurality of light receiving members fixed around said perimeter of said touch-panel and configured to receive said light recursively reflected from said reflecting member and to convert said light into electric signals, said plurality of light receiving members being integral with said plurality of light sources;

a signal analyzing mechanism configured to analyze said electric signals to detect a position of an obstacle when said obstacle is placed on said touch-panel and blocks the light output from said plurality of light sources;

a coordinate calculating mechanism configured to calculate a center between coordinates of edges of said obstacle; and a coordinate determining mechanism configured to determine a coordinate X of said position of said obstacle by executing equation $$X=X_n+2K[Y_s-\{Y_{(n+1)}+Y_n+Y_{(n-1)}\}/3]/\{Y_{(n+1)}-Y_{(n-1)}\},$$

wherein $Y_s$ represents a value of a light amount reference value, $Y_n$ represents a light amount value of an nth pixel to be a focus pixel, $Y_{(n-1)}$ represents a light amount value of a (n−1)th pixel, $Y_{(n+1)}$ represents a light amount value of a (n+1)th pixel, $X_n$ represents a coordinate of said nth pixel as the focus pixel, $X_{(n-1)}$ represents a coordinate of a (n−1)th pixel, $X_{(n+1)}$ represents a coordinate of a (n+1)th pixel, and K represents a coordinate difference between two adjacent pixels.

19. A coordinate input apparatus as defined in claim 18, wherein the emitted light from said plurality of light sources extends in a deltaic form centered at said fixing position.

20. A coordinate input apparatus, comprising:

a plurality of light source means fixed around a perimeter of a predefined input region for emitting light approximately in parallel to said predefined input region;

reflecting means for recursively reflecting said light from said perimeter of said predefined input region so that said light returns towards said plurality of light source means;

light receiving means for receiving said light recursively reflected from said reflecting means and for converting said light into electric signals;

signal analyzing means for analyzing said electric signals to detect a position of an obstacle when said obstacle is placed in said input region and blocks said light output from said plurality of light source means; and a coordinate determining means for calculating a center between coordinates of edges of said obstacle and for determining said center as a coordinate of said position of said obstacle in said input region based on a plurality of successively-aligned pixels in said electric signals, including at least a focus pixel and pixels immediately previous to and subsequent to said focus pixel.

21. A coordinate input apparatus as defined in claim 20, further comprising correcting means for correcting said electric signals respectively output from said light receiving means for an angle displacement of said light receiving means.

22. A coordinate input apparatus as defined in claim 20, further comprising correcting means for correcting said electric signals respectively output from said light receiving means for a position displacement of said light receiving means.

23. A coordinate input apparatus, comprising:

a plurality of light sources, each light source being fixed around a perimeter of a predefined input region at a fixing position different from others of the light sources and configured to emit light approximately in parallel to said predefined input region;

a reflecting member fixed around said perimeter of said predefined input region and configured to recursively reflect said light so that said light returns towards said plurality of light sources;

a plurality of light receiving members fixed around said perimeter of said predefined input region, configured to receive said light recursively reflected from said reflecting member and to convert said light into electric signals, and each of said plurality of light receiving members including a photoelectric conversion cell array including a plurality of photoelectric conversion cells placed in a line for receiving said light reflected from said reflecting member, an order of said plurality of said photoelectric conversion cells placed in the line corresponding to coordinates of said input region;

a signal analyzing mechanism configured to analyze said electric signals to detect a position of an obstacle when said obstacle is placed in said input region and blocks the light output from said plurality of light sources;

a coordinate determining mechanism configured to determine a coordinate of said position of said obstacle placed in said input region based on a result of an analysis made by said signal analyzing mechanism; and a correcting mechanism configured to correct said electric signals respectively output from each of said light receiving members for an angle displacement of each of said plurality of light receiving members.

24. A coordinate input apparatus as defined in claim 23, wherein the emitted light from said plurality of light sources extends in a deltaic form centered at said fixing position.

25. A coordinate input apparatus as defined in claim 23, wherein each photoelectric conversion cell array includes a charge-coupled device.

26. A coordinate input apparatus as defined in claim 23, wherein each photoelectric conversion cell array includes a phototransistor array.

27. A coordinate input apparatus as defined in claim 23, wherein each photoelectric conversion cell array includes a photodiode array.

28. A coordinate input apparatus, comprising:

a plurality of light sources, each light source being fixed around a perimeter of a predefined input region at a fixing position different from others of the light sources and configured to emit light approximately in parallel to said predefined input region;

a reflecting member fixed around said perimeter of said predefined input region and configured to recursively reflect said light so that said light returns towards said plurality of light sources;

a plurality of light receiving members fixed around said perimeter of said predefined input region, configured to receive said light recursively reflected from said reflecting member and to convert said light into electric signals, and each of said plurality of light receiving members including a photoelectric conversion cell array including a plurality of photoelectric conversion cells placed in a line for receiving said light reflected from said reflecting member, an order of said plurality of said photoelectric conversion cells placed in the line corresponding to coordinates of said input region;

a signal analyzing mechanism configured to analyze said electric signals to detect a position of an obstacle when said obstacle is placed in said input region and blocks the light output from said plurality of light sources;

a coordinate determining mechanism configured to determine a coordinate of said position of said obstacle placed in said input region based on a result of an analysis made by said signal analyzing mechanism; and a correcting mechanism configured to correct said electric signals respectively output from each of said light receiving members for a position displacement of each of said plurality of light receiving members.

29. A coordinate input apparatus as defined in claim 28, wherein the emitted light from said plurality of light sources extends in a deltaic form centered at said fixing position.

30. A coordinate input apparatus as defined in claim 28, wherein each photoelectric conversion cell array includes a charge-coupled device.

31. A coordinate input apparatus as defined in claim 28, wherein each photoelectric conversion cell array includes a phototransistor array.

32. A coordinate input apparatus as defined in claim 28, wherein each photoelectric conversion cell array includes a photodiode array.

33. A coordinate input apparatus comprising:

a plurality of light source means fixed around a perimeter of a predefined input region for emitting light approximately in parallel to said predefined input region;

reflecting means for recursively reflecting said light from said perimeter of said predefined input region so that said light returns towards said plurality of light source means;

light receiving means for receiving said light recursively reflected from said reflecting means and for converting said light into electric signals;

signal analyzing means for analyzing said electric signals to detect a position of an obstacle when said obstacle is placed in said input region and blocks said light output from said plurality of light source means;

a coordinate determining means for calculating a center between coordinates of edges of said obstacle and for determining said center as a coordinate of said position of said obstacle in said input region; and correcting means for correcting said electric signals respectively output from said light receiving means for an angle displacement of said light receiving means.

34. A coordinate input apparatus comprising:

a plurality of light source means fixed around a perimeter of a predefined input region for emitting light approximately in parallel to said predefined input region;

reflecting means for recursively reflecting said light from said perimeter of said predefined input region so that said light returns towards said plurality of light source means;

light receiving means for receiving said light recursively reflected from said reflecting means and for converting said light into electric signals;

signal analyzing means for analyzing said electric signals to detect a position of an obstacle when said obstacle is placed in said input region and blocks said light output from said plurality of light source means;

a coordinate determining means for calculating a center between coordinates of edges of said obstacle and for determining said center as a coordinate of said position of said obstacle in said input region; and correcting means for correcting said electric signals respectively output from said light receiving means for a position displacement of said light receiving means.

\* \* \* \* \*